(12) United States Patent
Kuwahara

(10) Patent No.: US 10,493,818 B2
(45) Date of Patent: Dec. 3, 2019

(54) REFRIGERATION CYCLE DEVICE

(71) Applicant: DENSO CORPORATION, Kariya, Aichi-pref. (JP)

(72) Inventor: Mikiharu Kuwahara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 407 days.

(21) Appl. No.: 15/316,210

(22) PCT Filed: Jun. 16, 2015

(86) PCT No.: PCT/JP2015/003008
§ 371 (c)(1),
(2) Date: Dec. 5, 2016

(87) PCT Pub. No.: WO2015/198559
PCT Pub. Date: Dec. 30, 2015

(65) Prior Publication Data
US 2017/0151856 A1    Jun. 1, 2017

(30) Foreign Application Priority Data

Jun. 27, 2014   (JP) ................................ 2014-132115

(51) Int. Cl.
*B60H 1/00*   (2006.01)
*F25B 41/04*  (2006.01)
(Continued)

(52) U.S. Cl.
CPC ....... *B60H 1/00921* (2013.01); *B60H 1/0075* (2013.01); *B60H 1/00392* (2013.01);
(Continued)

(58) Field of Classification Search
CPC ............ B60H 1/00921; B60H 1/00914; B60H 1/3207; B60H 1/3213; F25B 5/02;
(Continued)

(56) References Cited

U.S. PATENT DOCUMENTS 6,904,766 B2 *  6/2005  Ito ...................... B60H 1/00328
                                                    165/164
9,523,518 B2 * 12/2016  Kitamura ................ F25B 13/00
(Continued)

FOREIGN PATENT DOCUMENTS

JP    2003291635 A    10/2003
JP    2005512014 A     4/2005
(Continued)

*Primary Examiner* — Cassey D Bauer
*Assistant Examiner* — Miguel A Diaz
(74) *Attorney, Agent, or Firm* — Harness, Dickey & Pierce, P.L.C.

(57) ABSTRACT

When performing dehumidification heating of a space to be air-conditioned, a refrigeration cycle device is switched to a refrigerant circuit in which a flow of a refrigerant flowing out of an interior radiator is branched, and one of the branched refrigerants is decompressed by an interior expansion valve to evaporate in an interior evaporator, while the other of the branched refrigerants flows into a high-pressure side refrigerant passage of an internal heat exchanger and is then decompressed by an exterior expansion valve to evaporate in an exterior heat exchanger. Further, in the refrigerant circuit, a flow of the refrigerant flowing out of the interior evaporator and a flow of the refrigerant flowing out of the exterior heat exchanger are merged into a low-pressure side refrigerant passage of the internal heat exchanger. Thus, the refrigerant flowing into the interior evaporator is prevented from becoming a liquid-phase refrigerant having an unnecessarily high degree of supercooling, thereby achieving appropriate dehumidification heating.

14 Claims, 8 Drawing Sheets

DEHUMIDIFICATION HEATING MODE

(51) Int. Cl.
  *F25B 40/00*   (2006.01)
  *F25B 13/00*   (2006.01)
  *F25B 5/02*    (2006.01)
  *F25B 6/02*    (2006.01)
  *F25B 49/02*   (2006.01)
  *B60H 1/32*    (2006.01)

(52) U.S. Cl.
  CPC ......... *B60H 1/3207* (2013.01); *B60H 1/3213* (2013.01); *F25B 5/02* (2013.01); *F25B 6/02* (2013.01); *F25B 13/00* (2013.01); *F25B 41/04* (2013.01); *F25B 49/02* (2013.01); *B60H 2001/00957* (2013.01); *B60H 2001/326* (2013.01); *B60H 2001/3263* (2013.01); *F25B 40/00* (2013.01); *F25B 2313/02732* (2013.01)

(58) Field of Classification Search
  CPC .......... F25B 6/02; F25B 41/04; F25B 41/043; F25B 49/02; F25B 40/00–06; F25B 2600/2501; F25B 2400/04
  See application file for complete search history.

(56) References Cited

U.S. PATENT DOCUMENTS

| | | | |
|---|---|---|---|
| 2003/0182961 A1* | 10/2003 | Nishida | B60H 1/00921 62/324.1 |
| 2005/0103487 A1 | 5/2005 | Aflekt et al. | |
| 2005/0132731 A1 | 6/2005 | Nakamura et al. | |
| 2010/0326127 A1* | 12/2010 | Oomura | B60H 1/00785 62/498 |
| 2011/0005255 A1* | 1/2011 | Tanihata | B60H 1/00785 62/238.7 |
| 2012/0085114 A1 | 4/2012 | Graaf et al. | |
| 2012/0255319 A1* | 10/2012 | Itoh | F24F 3/1405 62/160 |
| 2014/0338382 A1* | 11/2014 | Miyakoshi | F25B 5/00 62/159 |
| 2014/0373562 A1* | 12/2014 | Suzuki | F25B 5/00 62/159 |
| 2015/0059375 A1* | 3/2015 | Oomura | B60H 1/00785 62/155 |
| 2016/0052365 A1* | 2/2016 | Kohigashi | B60H 1/00921 165/202 |
| 2016/0068047 A1* | 3/2016 | Kobayashi | F25B 5/04 62/401 |
| 2016/0153695 A1* | 6/2016 | Hamamoto | B60H 1/00921 62/140 |
| 2016/0153697 A1* | 6/2016 | Hamamoto | B60H 1/00921 62/140 |
| 2016/0257179 A1* | 9/2016 | Miyakoshi | B60L 58/12 |
| 2018/0156509 A1* | 6/2018 | Tada | F25B 41/04 |
| 2018/0201088 A1* | 7/2018 | Nomura | F25B 47/02 |
| 2018/0236845 A1* | 8/2018 | Miyakoshi | B60H 1/00921 |
| 2019/0023100 A1* | 1/2019 | Suzuki | F25B 5/02 |

FOREIGN PATENT DOCUMENTS

| | | | |
|---|---|---|---|
| JP | 2005180762 A | 7/2005 | |
| JP | 4630772 B2 | 2/2011 | |
| JP | 2012225637 A | 11/2012 | |
| JP | 2013139991 A | 7/2013 | |
| JP | 5391379 B2 | 1/2014 | |
| JP | 2017227366 A * | 12/2017 | ................ F25B 1/00 |

\* cited by examiner

REFRIGERATION CYCLE DEVICE

CROSS REFERENCE TO RELATED APPLICATIONS

This application is a U.S. National Phase Application under 35 U.S.C. 371 of International Application No. PCT/JP2015/003008 filed on Jun. 16, 2015 and published in Japanese as WO 2015/198559 A1 on Dec. 30, 2015. This application is based on and claims the benefit of priority from Japanese Patent Application No. 2014-132115 filed on Jun. 27, 2014. The entire disclosures of all of the above applications are incorporated herein by reference.

FIELD OF THE INVENTION

The present disclosure relates to a refrigeration cycle device including an internal heat exchanger.

BACKGROUND ART

Conventionally, an air-conditioning vapor-compression refrigeration cycle device, which is applied to an air conditioner, is known to include an internal heat exchanger. This kind of internal heat exchanger is designed to exchange heat between high-pressure and low-pressure side refrigerants in a cycle, thereby exhibiting the effect of enlarging a difference in enthalpy (refrigeration capacity) between outlet and inlet-side refrigerants in another heat exchanger serving as an evaporator to improve a coefficient of performance (COP) of the cycle.

For example, Patent Document 1 discloses an air-conditioning refrigeration cycle device including an internal heat exchanger. The refrigeration cycle device is configured to be switchable between a refrigerant circuit for an air-cooling mode of cooling ventilation air to be blown into a space to be air-conditioned and a refrigerant circuit for a dehumidification heating mode of reheating the ventilation air cooled and dehumidified.

More specifically, the refrigeration cycle device described in Patent Document 1 is configured to switch to the refrigerant circuit in the air-cooling mode. In the refrigerant circuit, a refrigerant circulates through a compressor, an exterior heat exchanger, a high-pressure side refrigerant passage of the internal heat exchanger, a decompression device for an interior evaporator, the interior evaporator, a low-pressure side refrigerant passage of the internal heat exchanger, and the compressor in this order. The exterior heat exchanger exchanges heat between the refrigerant and outside air. The interior evaporator exchanges heat between the refrigerant and the ventilation air to be blown into the space to be air-conditioned, thereby cooling the ventilation air.

The refrigeration cycle device is configured to switch to the refrigerant circuit in the dehumidification heating mode. In the refrigerant circuit, the refrigerant circulates through the compressor, an interior radiator, a branch portion, the high-pressure side refrigerant passage of the internal heat exchanger, the decompression device for the interior evaporator, the interior evaporator, a merging portion, the low-pressure side refrigerant passage of the internal heat exchanger, and the compressor in this order. At the same time, in the refrigerant circuit, the refrigerant also circulates through the branch portion, a decompression device for the exterior heat exchanger, the exterior heat exchanger, and the merging portion in this order. The interior radiator exchanges heat between the refrigerant and ventilation air cooled by the evaporator to thereby heat the ventilation air.

Thus, the refrigeration cycle device described in Patent Document 1 is designed to enhance the refrigeration capacity of the interior evaporator in both operation modes of the air-cooling mode and dehumidification heating mode, thereby improving the COP of the cycle.

RELATED ART DOCUMENT

Patent Document

Patent Document 1: Japanese Patent Publication No. 5391379

SUMMARY OF THE INVENTION

As mentioned above, in the dehumidification heating mode, the refrigeration cycle device described in Patent Document 1 allows one of the refrigerants branched by the branch portion to flow into the high-pressure side refrigerant passage of the internal heat exchanger, and also allows a refrigerant into which the refrigerants are merged in the merging portion to flow into the low-pressure side refrigerant passage of the internal heat exchanger. Thus, in the dehumidification heating mode, the flow rate (mass flow rate) of the high-pressure side refrigerant circulating through the high-pressure side refrigerant passage becomes smaller than that of the low-pressure side refrigerant circulating through the low-pressure side refrigerant passage.

For this reason, the enthalpy of the refrigerant flowing out of the high-pressure side refrigerant passage is significantly decreased, whereby the refrigerant flowing into the interior evaporator might become a liquid-phase refrigerant having a high degree of supercooling in some cases.

When such a liquid-phase refrigerant with the high degree of supercooling flows into the interior evaporator, the distributivity of the refrigerant in the interior evaporator is worsened, making it more likely to cause temperature distribution in the ventilation air cooled by the interior evaporator. As a result, part of the ventilation air to be blown into the space to be air-conditioned cannot be dehumidified sufficiently, which fails to achieve the appropriate dehumidification heating of the space to be air-conditioned.

In view of the foregoing matter, it is an object of the present disclosure to achieve the appropriate dehumidification heating of a space to be air-conditioned in a refrigeration cycle device for an air conditioner and including an internal heat exchanger.

According to a first aspect of the present disclosure, a refrigeration cycle device to be used for an air conditioner includes: a compressor adapted to compress and discharge a refrigerant; an interior radiator that heats ventilation air to be blown into a space to be air-conditioned, using a high-pressure side refrigerant in a cycle as a heat source; an interior evaporator that cools the ventilation air by exchanging heat between a low-pressure side refrigerant in the cycle and the ventilation air before passing through the interior radiator; an exterior heat exchanger that exchanges heat between the refrigerant and outside air; a first decompression device that decompresses the refrigerant flowing into the interior evaporator; a second decompression device that decompresses the refrigerant flowing into the exterior heat exchanger; an internal heat exchanger that exchanges heat between the high-pressure side refrigerant and the low-pressure side refrigerant; a branch portion that branches a flow of the refrigerant flowing out of the interior radiator; a merging portion that merges a flow of the refrigerant flowing out of the interior evaporator with a flow of the refrigerant flowing out of the exterior heat exchanger; and a refrigerant-circuit switching portion that switches a refrigerant circuit in the cycle.

The refrigerant-circuit switching portion is configured to be switchable between a first refrigerant circuit and a second refrigerant circuit. Here, the first refrigerant circuit is adapted to allow the refrigerant discharged from the compressor to circulate through the exterior heat exchanger, a high-pressure side refrigerant passage of the internal heat exchanger, the first decompression device, the interior evaporator, a low-pressure side refrigerant passage of the internal heat exchanger, and a suction port side of the compressor in this order. In contrast, the second refrigerant circuit is adapted to allow the refrigerant discharged from the compressor to circulate through the interior radiator, the branch portion, the first decompression device, the interior evaporator, the merging portion, the low-pressure side refrigerant passage, and the suction port side of the compressor in this order, while simultaneously allowing the refrigerant discharged from the compressor to circulate through the interior radiator, the branch portion, the high-pressure side refrigerant passage, the second decompression device, the exterior heat exchanger, the merging portion, the low-pressure side refrigerant passage, and the suction port side of the compressor in this order.

Thus, when the refrigerant-circuit switching portion switches to the first refrigerant circuit, the ventilation air is cooled by the interior evaporator, thereby enabling air-cooling of the space to be air-conditioned.

Furthermore, when switching to the first refrigerant circuit, the internal heat exchanger exchanges heat between the high-pressure side refrigerant on the upstream side of the interior evaporator and the low-pressure side refrigerant on the downstream side of the interior evaporator, thus enlarging a difference in enthalpy (refrigeration capacity) between the outlet and inlet-side refrigerants of the interior evaporator, thereby improving the COP of the cycle.

At this time, in the internal heat exchanger, the flow rate (mass flow rate) of the high-pressure side refrigerant circulating through the high-pressure side refrigerant passage becomes substantially equal to that of the low-pressure side refrigerant circulating through the low-pressure side refrigerant passage. Thus, the refrigerant flowing into the interior evaporator can be prevented from becoming a liquid-phase refrigerant having an unnecessarily high degree of supercooling.

Therefore, the occurrence of a temperature distribution in the ventilation air cooled by the interior evaporator can be prevented to achieve the appropriate air-cooling of the space to be air-conditioned.

When the refrigerant-circuit switching portion switches to the second refrigerant circuit, the ventilation air cooled and dehumidified by the interior evaporator can be reheated by the interior radiator, thereby enabling dehumidification heating of the space to be air-conditioned.

Furthermore, the internal heat exchanger exchanges heat between the high-pressure side refrigerant on the upstream side of the exterior heat exchanger that is branched in the branch portion and the low-pressure side refrigerant into which the refrigerants are merged in the merging portion, thereby enlarging a refrigeration capacity of the exterior heat exchanger, improving the COP of the cycle. In this way, the heat for reheating the ventilation air in the exterior heat exchanger can be effectively absorbed from the outside air.

At this time, in the internal heat exchanger, the flow rate (mass flow rate) of the high-pressure side refrigerant circulating through the high-pressure side refrigerant passage becomes lower than that of the low-pressure side refrigerant circulating through the low-pressure side refrigerant passage. Thus, although the refrigerant flowing into the exterior heat exchanger could be a liquid-phase refrigerant having a high degree of supercooling, the refrigerant flowing into the interior evaporator does not become a liquid-phase refrigerant that has an unnecessarily high degree of supercooling.

Therefore, the occurrence of a temperature distribution in the ventilation air cooled by the interior evaporator can be prevented to achieve the appropriate dehumidification heating of the space to be air-conditioned.

According to a second aspect of the present disclosure, a refrigeration cycle device to be used for an air conditioner includes: a compressor adapted to compress and discharge a refrigerant; an interior radiator that heats ventilation air to be blown into a space to be air-conditioned, using a high-pressure side refrigerant in a cycle as a heat source; an interior evaporator that cools the ventilation air by exchanging heat between a low-pressure side refrigerant in the cycle and the ventilation air before passing through the interior radiator; an exterior heat exchanger that exchanges heat between the refrigerant and outside air; a first decompression device that decompresses the refrigerant flowing into the interior evaporator; a second decompression device that decompresses the refrigerant flowing into the exterior heat exchanger; an internal heat exchanger that exchanges heat between the high-pressure side refrigerant and the low-pressure side refrigerant; a bypass passage that allows the refrigerant to bypass at least one of a high-pressure side refrigerant passage and a low-pressure side refrigerant passage of the internal heat exchanger; an opening/closing device that opens and closes the bypass passage; a branch portion that branches a flow of the refrigerant flowing out of the interior radiator; a merging portion that merges a flow of the refrigerant flowing out of the interior evaporator with a flow of the refrigerant flowing out of the exterior heat exchanger; and a refrigerant-circuit switching portion that switches a refrigerant circuit in the cycle.

The refrigerant-circuit switching portion is configured to be switchable between a third refrigerant circuit and a fourth refrigerant circuit. Here, the third refrigerant circuit is adapted to allow the refrigerant discharged from the compressor to circulate through the exterior heat exchanger, the high-pressure side refrigerant passage, the first decompression device, the interior evaporator, the low-pressure side refrigerant passage, and a suction port side of the compressor in this order, in a state where the opening/closing device closes the bypass passage. Furthermore, the fourth refrigerant circuit is adapted to allow the refrigerant discharged from the compressor to circulate through the interior radiator, the branch portion, the first decompression device, the interior evaporator, the merging portion, and the suction port side of the compressor in this order, while simultaneously allowing the refrigerant discharged from the compressor to circulate through the interior radiator, the branch portion, the second decompression device, the exterior heat exchanger, the merging portion, and the suction port side of the compressor in this order, in a state where the opening/closing device opens the bypass passage.

Thus, when the refrigerant-circuit switching portion switches to the third refrigerant circuit, the air-cooling of the space to be air-conditioned can be performed in the same way as the first aspect described above. Further, the COP of the cycle can be improved by the effect of the internal heat exchanger.

When the refrigerant-circuit switching portion switches to the fourth refrigerant circuit, the dehumidification heating of the space to be air-conditioned can be performed in the same way as the first aspect described above. Further, when switching to the fourth refrigerant circuit, the opening/closing device opens the bypass passage, thus preventing the heat exchange between the high-pressure and low-pressure side refrigerants in the internal heat exchanger. Thus, the refrigerant flowing into the interior evaporator can be prevented from becoming a liquid-phase refrigerant having an unnecessarily high degree of supercooling.

Therefore, the occurrence of a temperature distribution in the ventilation air cooled by the interior evaporator can be prevented to achieve the appropriate dehumidification heating of the space to be air-conditioned.

Here, the high-pressure side refrigerant in the refrigerant cycle is a refrigerant that circulates through the refrigerant flow path leading from the discharge port side of the compressor to the inlet side of one or both of the first and second decompression devices exhibiting the decompression effect.

Therefore, when both decompression devices exhibit the decompression effect, the refrigerant circulating through the refrigerant flow path leading from the discharge port side of the compressor to the inlet side of the first decompression device as well as the refrigerant circulating through the refrigerant flow path leading from the discharge port side of the compressor to the inlet side of the second decompression device both become the high-pressure side refrigerants.

On the other hand, the low-pressure side refrigerant in the cycle is a refrigerant that circulates through the refrigerant flow path leading from the outlet side of one or both of the first and second decompression devices exhibiting the decompression effect to the suction port side of the compressor.

Therefore, when both decompression devices exhibit the decompression effect, the refrigerant circulating through the refrigerant flow path leading from the outlet side of the first decompression device to the suction port side of the compressor as well as the refrigerant circulating through the refrigerant flow path leading from the outlet side of the second decompression device to the suction port side of the compressor both become the low-pressure side refrigerants.

DESCRIPTION OF THE EMBODIMENTS

First Embodiment

Figure 1:
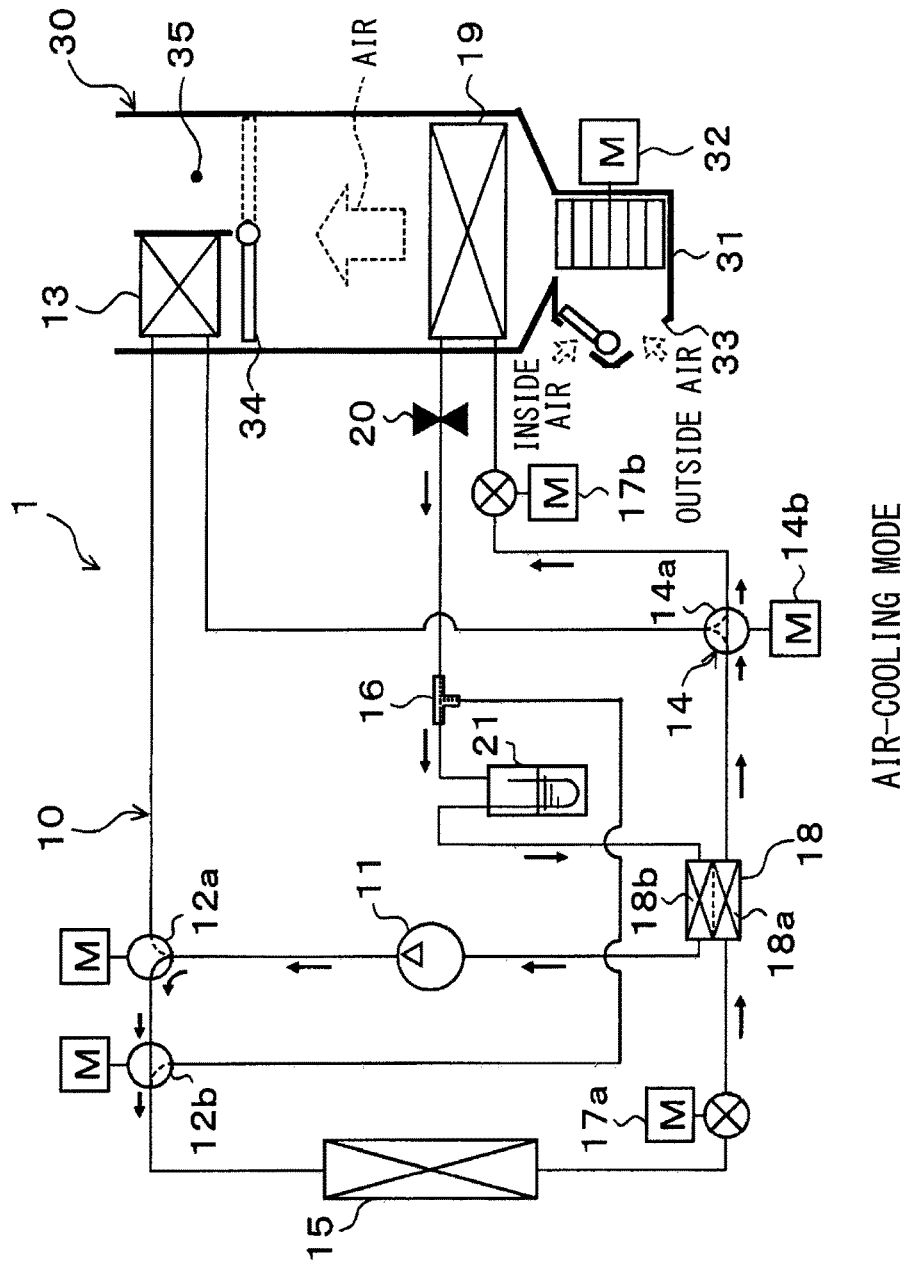
FIG. 1 is an entire configuration diagram of a vehicle air conditioner, showing the flow of a refrigerant in a refrigeration cycle device in an air-cooling mode according to a first embodiment.

A first embodiment of the present disclosure will be described below with reference to FIGS. 1 to 5. In this embodiment, a refrigeration cycle device 10 according to the present disclosure is applied to a vehicle air conditioner 1 for an electric vehicle that obtains a driving force for traveling from a traveling electric motor. The refrigeration cycle device 10 in the vehicle air conditioner 1 serves to cool or heat the ventilation air to be blown into the vehicle interior as a space to be air-conditioned.

The refrigeration cycle device 10 is configured to be switchable between a refrigerant circuit (see FIG. 1) in an air-cooling mode of performing air-cooling of the vehicle interior by cooling the ventilation air and a refrigerant circuit (see FIG. 2) in a dehumidification heating mode of performing dehumidification heating of the vehicle interior by reheating the ventilation air cooled and dehumidified.

The refrigeration cycle device 10 forms a vapor-compression subcritical refrigeration cycle in which a high-pressure side refrigerant pressure Pd does not exceed the critical pressure of the refrigerant, using a hydrofluorocarbon (HFC)-based refrigerant (e.g., R134a) as the refrigerant. Obviously, a hydrofluoroolefin (HFO)-based refrigerant (e.g., R1234yf) or the like may be adopted as the refrigerant. Further, refrigerating machine oil for lubricating a compressor 11 is mixed into the refrigerant, and a part of the refrigerating machine oil circulates through the cycle together with the refrigerant.

Among components of the refrigeration cycle device 10, the compressor 11 is disposed in a bonnet of the vehicle, and adapted to draw, compress, and discharge the refrigerant in the refrigeration cycle device 10. The compressor 11 of this embodiment is configured as an electric compressor that includes a fixed displacement compression mechanism with a discharge capacity fixed, driven by an electric motor. Specifically, the compression mechanism suitable for use can include various types of compression mechanisms, such as a scroll compression mechanism, and a vane compression mechanism.

The electric motor has its operation (the number of revolutions) controlled by a control signal output from an air-conditioning controller 40 to be described later. The electric motor may employ either an AC motor or a DC motor. The air-conditioning controller 40 controls the number of revolutions of the electric motor, thereby changing the refrigerant discharge capacity of the compression mechanism.

The refrigerant outlet side of the compressor 11 is connected to one refrigerant inflow/outflow port of a first three-way valve 12a. The first three-way valve 12a is a refrigerant circuit switch that switches to a refrigerant circuit for connecting a discharge port side of the compressor 11 to one refrigerant inflow/outflow port of a second three-way valve 12b in the air-cooling mode, and switches to a refrigerant circuit for connecting the discharge port side of the compressor 11 to a refrigerant inlet side of an interior radiator 13 in the dehumidification heating mode. Note that the first three-way valve 12a has its operation controlled by a control voltage output from the air-conditioning controller 40.

The interior radiator 13 is disposed in a casing 31 of an interior air-conditioning unit 30 to be described later. The interior radiator 13 is a heating heat exchanger that heats the ventilation air by using the refrigerant discharged from the compressor 11 as a heat source. In more detail, the interior radiator 13 exchanges heat between the refrigerant discharged from the compressor 11 and the ventilation air passing through an interior evaporator 19 to be described later, thereby heating the ventilation air. A refrigerant outlet side of the interior radiator 13 is connected to one inflow/outflow port of a branch function-equipped three-way valve 14 to be described later.

The second three-way valve 12b is a refrigerant circuit switch that switches to a refrigerant circuit for connecting another inflow/outflow port of the first three-way valve 12a to one refrigerant inflow/outflow port of an exterior heat exchanger 15 in the air-cooling mode, and switches to a refrigerant circuit for connecting one refrigerant inflow/outflow port of the exterior heat exchanger 15 to one refrigerant inflow port of a three-way joint 16 in the dehumidification heating mode. The second three-way valve 12b has substantially the same basic structure as that of the first three-way valve 12a.

The three-way joint 16 serves as a merging portion that merges the flow of the refrigerant flowing out of the interior evaporator 19 and passing through an evaporation-pressure adjustment valve 20 with the flow of the refrigerant flowing out of the exterior heat exchanger 15 and passing through the second three-way valve 12b in at least the dehumidification heating mode. That is, the three-way joint 16 uses two of three refrigerant inflow ports as refrigerant inflow ports and the remaining one as a refrigerant outflow port in at least the dehumidification heating mode.

Such a three-way joint 16 may be formed by jointing pipes with different diameters, or by providing a plurality of refrigerant passages in a metal or resin block.

The exterior heat exchanger 15 is a heat exchanger disposed at the front side of the vehicle bonnet and adapted to exchange heat between the refrigerant circulating through the inside thereof and a vehicle exterior air (outside air) blown by a blower fan (not shown). The blower fan is an electric blower that has the number of revolutions (blowing capacity) controlled by a control voltage output from the air-conditioning controller 40.

One inflow/outflow port of an exterior expansion valve 17a is disposed at the other refrigerant inflow/outflow port of the exterior heat exchanger 15. The exterior expansion valve 17a serves as a decompression device (second decompression device) that decompresses the refrigerant to flow into the exterior heat exchanger 15 in at least the dehumidification heating mode. The exterior expansion valve 17a is a variable throttle mechanism that includes a valve body configured to have its throttle opening degree variable, and an electric actuator formed by a stepping motor for varying the throttle opening degree of the valve body.

Further, the exterior expansion valve 17a is configured as a variable throttle mechanism equipped with a fully-opening function that serves merely as a refrigerant passage almost without exhibiting a refrigerant decompressing function by fully opening the throttle opening degree. Note that the exterior expansion valve 17a has its operation controlled by a control signal (control pulse) output from the air-conditioning controller 40.

The other inflow/outflow port of the exterior expansion valve 17a is connected to one inflow/outflow port of a high-pressure side refrigerant passage 18a of an internal heat exchanger 18. The internal heat exchanger 18 serves to exchange heat between the high-pressure and low-pressure side refrigerants in the cycle to thereby decrease the enthalpy of the high-pressure side refrigerant.

Such an internal heat exchanger 18 can adopt a double-piped heat exchanger that includes an outer pipe and an inner pipe disposed within the outer pipe. The outer pipe forms the high-pressure side refrigerant passage 18a for circulation of the high-pressure side refrigerant. The inner pipe forms a low-pressure side refrigerant passage 18b for circulation of the low-pressure side refrigerant. Furthermore, in the internal heat exchanger 18 of this embodiment, a passage cross-sectional area of the high-pressure side refrigerant passage 18a for circulation of the high-pressure side refrigerant with a higher density is formed to be smaller than a passage area of the low-pressure side refrigerant passage 18b for circulation of the low-pressure side refrigerant with a lower density.

Here, the high-pressure side refrigerant in the cycle of this embodiment is a refrigerant that circulates through a refrigerant flow path leading from the discharge port side of the compressor 11 to the inlet side of the decompression device that exhibits a decompression effect (the exterior expansion valve 17a and an interior expansion valve 17b to be described later in this embodiment). Therefore, the high-pressure side refrigerant has substantially the same pressure as that of the discharge refrigerant discharged from the compressor 11 without consideration of the pressure loss that would otherwise occur when the refrigerant circulates through the cycle.

On the other hand, the low-pressure side refrigerant in the cycle is a refrigerant that circulates through a refrigerant flow path leading from the outlet side of the decompression device exhibiting the decompression effect to the suction port side of the compressor 11. Therefore, the low-pressure side refrigerant has substantially the same pressure as that of the suction refrigerant drawn into the compressor 11 without consideration of the pressure loss that would otherwise occur when the refrigerant circulates through the cycle.

Further, the other inflow/outflow port side of the high-pressure side refrigerant passage 18a of the internal heat exchanger 18 is connected to another inflow/outflow port side of the branch function-equipped three-way valve 14. A further inflow/outflow port side of the branch function-equipped three-way valve 14 is connected to the inflow port side of interior expansion valve 17b as a decompression device (first decompression device) for decompressing the refrigerant to flow into the interior evaporator 19. The interior expansion valve 17b has substantially the same basic structure as that of the exterior expansion valve 17a.

The branch function-equipped three-way valve 14 has a passage formation portion 14a that has the same structure as the above-mentioned three-way joint 16, and an electric opening/closing mechanism 14b that opens and closes an inflow/outflow port of the passage formation portion 14a connected to a refrigerant outlet side of the interior radiator 13. The opening/closing mechanism 14b has its operation controlled by a control voltage output from the air-conditioning controller 40.

In the air-cooling mode, the branch function-equipped three-way valve 14 serves to switch to a refrigerant circuit that connects the other inflow/outflow port of the high-pressure side refrigerant passage 18a to one inflow/outflow port of the interior expansion valve 17b. In the dehumidification heating mode, the branch function-equipped three-way valve 14 serves to switch to a refrigerant circuit that connects the refrigerant outlet side of the interior radiator 13 to the other inflow/outflow port of the high-pressure side refrigerant passage 18a, while connecting the refrigerant outlet side of the interior radiator 13 to the one inflow/outflow port of the interior expansion valve 17b at the same time.

That is, in the dehumidification heating mode of this embodiment, the passage formation portion 14a of the branch function-equipped three-way valve 14 serves as a branch portion that branches the flow of the refrigerant flowing out of the interior radiator 13, thereby allowing one branched refrigerant to flow to the other inflow/outflow port side of the high-pressure side refrigerant passage 18a, and allowing the other branched refrigerant to flow to the inflow port side of the interior expansion valve 17b. Furthermore, the opening/closing mechanism 14b of the branch function-equipped three-way valve 14 serves as a refrigerant-circuit switching portion.

The outflow port side of the interior expansion valve 17b is connected to the refrigerant inlet side of the interior evaporator 19. The interior evaporator 19 is disposed in the casing 31 of the interior air-conditioning unit 30 on the upstream side of the ventilation air flow relative to the interior radiator 13. The interior evaporator 19 is a cooling heat exchanger that exchanges heat between the low-pressure refrigerant circulating therethrough and the ventilation air prior to passing through the interior radiator 13, causing the refrigerant to evaporate and exhibit its heat absorption function, thereby cooling the ventilation air.

In this embodiment, the interior evaporator 19 is configured as the so-called tank and tube type heat exchanger that includes a plurality of tubes through which the refrigerant circulates, and a pair of distribution-collection tanks connected to both ends of the tubes for collecting or distributing the refrigerants.

The refrigerant outlet side of the interior evaporator 19 is connected to the inlet side of the evaporation-pressure adjustment valve 20. The evaporation-pressure adjustment valve 20 has the function of maintaining the refrigerant evaporation pressure (refrigerant evaporation temperature) in the interior evaporator 19 to a predetermined reference evaporation pressure (reference evaporation temperature) or more in order to suppress the frost formation (frost) on the interior evaporator 19.

More specifically, the evaporation-pressure adjustment valve 20 is a mechanical variable throttle mechanism that increases the opening degree of the valve with increasing pressure of the refrigerant on the outlet side of the interior evaporator 19. In this embodiment, R134a is employed as the refrigerant, and the reference evaporation temperature is set slightly higher than 0° C., whereby the reference evaporation pressure is set to a value slightly higher than 0.293 MPa.

The outlet side of the evaporation-pressure adjustment valve 20 is connected to the inlet side of an accumulator 21 by the above-mentioned three-way joint 16. The accumulator 21 is a gas-liquid separator that separates the refrigerant flowing therein into gas and liquid phase refrigerants to store therein the excessive refrigerant within the cycle while allowing the separated gas-phase refrigerant to flow out to the downstream side.

A gas-phase refrigerant outlet of the accumulator 21 is connected to the inflow side of the low-pressure side refrigerant passage 18b of the internal heat exchanger 18 described above. That is, the accumulator 21 is disposed in a refrigerant flow path that leads from the refrigerant outflow port of the three-way joint 16 to the inlet side of the low-pressure side refrigerant passage 18b of the internal heat exchanger 18. Further, the outflow port side of the low-pressure side refrigerant passage 18b is connected to the suction port side of the compressor 11.

Next, the interior air-conditioning unit 30 will be described. The interior air-conditioning unit 30 is to blow out the ventilation air having its temperature adjusted by the refrigeration cycle device 10, into the vehicle interior. The interior air-conditioning unit 30 is disposed inside a dashboard (instrumental panel) at the foremost portion of the vehicle interior. The interior air-conditioning unit 30 accommodates in the casing 31 forming its outer envelope, a blower 32, the interior evaporator 19, the interior radiator 13, and the like.

The casing 31 forms an air passage for the ventilation air to be blown into the vehicle interior. The casing 31 is formed of resin (for example, polypropylene) with some elasticity and excellent strength. An inside/outside air switch 33 is disposed on the most upstream side of the ventilation-air flow in the casing 31. The inside/outside air switch 33 serves as an inside/outside air switching portion that switches between the inside air (vehicle interior air) and the outside air (vehicle exterior air) to guide the selected air into the casing 31.

The inside/outside air switch 33 continuously adjusts the opening areas of an inside-air introduction port for introducing the inside air into the casing 31 and an outside-air introduction port for introducing the outside air thereinto by means of an inside/outside air switching door, thereby continuously changing the ratio of the volume of the inside air to that of the outside air. The inside/outside air switching door is driven by an electric actuator for the inside/outside air switching door, and the electric actuator has its operation controlled by a control signal output from the air-conditioning controller 40.

The fan (blower) 32 is disposed on the downstream side of the ventilation-air flow of the inside/outside air switch 33 so as to blow the air drawn toward the vehicle interior via the inside/outside air switch 33. The blower 32 is an electric blower that drives a multi-blade centrifugal fan (sirocco fan) by the electric motor and has the number of revolutions (blowing volume) controlled by a control voltage output from the air-conditioning controller 40.

The interior evaporator 19 and the interior radiator 13 are disposed on the downstream side of the ventilation air flow from the blower 32 in this order with respect to the ventilation air flow. In other words, the interior evaporator 19 is disposed on the upstream side of the ventilation air flow relative to the interior radiator 13. A cold-air bypass passage 35 is formed inside the casing 31 to allow the ventilation air passing through the interior evaporator 19 to flow to the downstream side while bypassing the interior radiator 13.

An air mix door 34 is disposed on the downstream side of the ventilation air flow relative to the interior evaporator 19 and on the upstream side of the ventilation air flow relative to the interior radiator 13. The air mix door 34 in this embodiment is a ventilation path switching portion that switches between a ventilation path for guiding the ventilation air passing through the interior evaporator 19 to the interior radiator 13 side and a ventilation path for guiding the ventilation air to the cold-air bypass passage 35 side.

The air mix door 34 serves as an air-volume-ratio adjustment portion that adjusts the ratio of the volume of the air passing through the interior radiator 13 to the total volume of the ventilation air passing through the interior evaporator 19. The air mix door 34 is driven by an electric actuator for driving the air mix door, and the electric actuator has its operation controlled by a control signal output from the air-conditioning controller 40.

An inflow space is disposed on the downstream side of the ventilation air flow relative to the interior radiator 13 so as to allow for the inflow of the ventilation air heated by the interior radiator 13 or the ventilation air passing through the cold-air bypass passage 35 and not heated by the interior radiator 13. Further, on the most downstream side of the ventilation air flow in the casing 31, openings are provided for blowing out the ventilation air (conditioned air) entering the inflow space, toward the vehicle interior as a space to be air-conditioned.

Specifically, the openings include a face opening for blowing the conditioned air toward the upper body of an occupant in the vehicle interior, a foot opening for blowing the conditioned air toward the feet of the occupant, and a defroster opening (all openings not shown) for blowing the conditioned air toward the inner surface of a windshield of the vehicle.

The face opening, the foot opening, and the defroster opening have their downstream sides of the ventilation air flow connected to a face air outlet, a foot air outlet, and a defroster air outlet (all air outlets not shown) provided in the vehicle compartment, respectively, via ducts forming their air passages.

A face door for adjusting an opening area of the face opening, a foot door for adjusting an opening area of the foot opening, and a defroster door (all doors not shown) for adjusting an opening area of the defroster opening are disposed on the upstream sides of the ventilation air flow relative to the face opening, the foot opening, and the defroster opening, respectively.

The face door, foot door, and defroster door serve as an opening mode switch for switching the mode of the opening, and are coupled to electric actuators for driving the air-outlet mode doors via a link mechanism and the like to be rotated in cooperation with the corresponding actuator. Note that the electric actuator also has its operation controlled by a control signal output from the air-conditioning controller 40.

Specifically, the air-outlet modes switched by an air-outlet mode switching portion include, for example, a face mode, a bi-level mode, a foot mode, and a foot-defroster mode. In the face mode, the face air outlet is fully opened to blow the air from the face air outlet toward the upper body of the occupant in the vehicle compartment. In the bi-level mode, both the face air outlet and foot air outlet are opened to blow air toward the upper body and feet of the occupant in the vehicle compartment. In the foot mode, the foot air outlet is fully opened with the defroster air outlet opened only by a small opening degree to blow the air mainly from the foot air outlet. In the foot-defroster mode, the foot air outlet and the defroster air outlet are opened by the same degree to blow the air from both the foot air outlet and the defroster air outlet.

A blowing-mode selector switch installed on an operation panel 60 is manually operated by the occupant, whereby the defroster air outlet is fully opened to set a defroster mode of blowing the air from the defroster air outlet toward the inner surface of the windshield of the vehicle.

Figure 3:
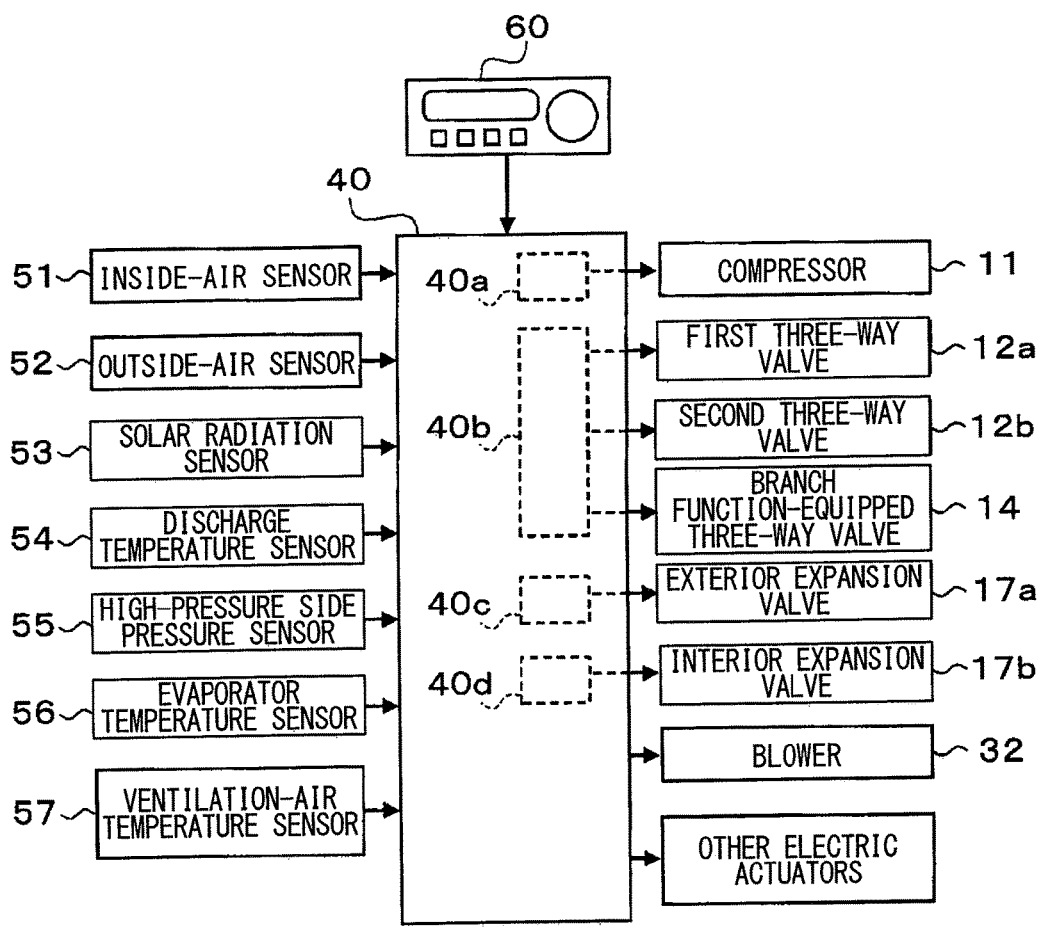
FIG. 3 is a block diagram showing an electric control unit of the vehicle air conditioner in the first embodiment.

Next, an electric control unit in this embodiment will be described with reference to FIG. 3. The air-conditioning controller 40 is configured of a known microcomputer, including CPU, ROM, and RAM, and a peripheral circuit thereof. The controller performs various computations and processing based on air-conditioning control programs stored in the ROM to thereby control the operations of various air-conditioning control devices, including the compressor 11, first three-way valve 12a, second three-way valve 12b, branch function-equipped three-way valve 14, exterior expansion valve 17a, interior expansion valve 17b, blower 32, and the like, which are connected to the output side of the controller.

A group of air-conditioning control sensors is connected to the input side of the air-conditioning controller 40, to which detection signals from the air-conditioning control sensor group are input.

The air-conditioning control sensor group includes an inside-air sensor 51, an outside-air sensor 52, a solar radiation sensor 53, a discharge temperature sensor 54, a high-pressure side pressure sensor 55, an evaporator temperature sensor 56, and a ventilation-air temperature sensor 57. The inside-air sensor 51 is an inside-air temperature detector that detects a vehicle interior temperature (inside air temperature) Tr. The outside-air sensor 52 is an outside-air temperature detector that detects a vehicle exterior temperature (outside air temperature) Tam. The solar radiation sensor 53 is a solar-radiation amount detector that detects the amount of solar radiation As applied to the vehicle interior. The discharge temperature sensor 54 detects a discharge refrigerant temperature Td of the refrigerant discharged from the compressor 11. The high-pressure side pressure sensor 55 detects a refrigerant pressure (high-pressure side refrigerant pressure) Pd on the outlet side of the interior radiator 13. The evaporator temperature sensor 56 detects a refrigerant evaporation temperature (evaporator temperature) Tefin in the interior evaporator 19. The ventilation-air temperature sensor 57 detects a ventilation-air temperature TAV of air to be blown from the inflow space to the vehicle interior.

Note that the evaporator temperature sensor 56 in this embodiment detects a heat-exchange fin temperature in the interior evaporator 19, but may be a temperature detector that detects the temperature of other parts of the interior evaporator 19, or alternatively a temperature detector that directly detects the temperature of a refrigerant itself circulating through the interior evaporator 19.

In this embodiment, the ventilation-air temperature sensor is provided for detecting the ventilation-air temperature TAV. The ventilation-air temperature TAV suitable for use may be a value determined by calculation based on the evaporator temperature Tefin and the discharge refrigerant temperature Td.

The operation panel 60 is disposed near the dashboard at the front of the vehicle compartment, and connected to the input side of the air-conditioning controller 40. Operation signals from various types of air-conditioning operation switches provided on the operation panel 60 are input to the air-conditioning controller 40.

Specifically, various air-conditioning operation switches on the operation panel 60 include an automatic switch, an air-cooling switch (A/C switch), an air-volume setting switch, a temperature-setting switch, and a blowing-mode selector switch. The automatic switch serves to set or reset an automatic control operation of the vehicle air conditioner 1. The air-cooling switch makes a request for air-cooling of the vehicle interior. The air-volume setting switch allows the occupant to manually set the volume of air from the blower 32. The temperature setting switch serves to set the vehicle interior preset temperature Tset, which is a target temperature of the vehicle interior. The blowing-mode selector switch allows the occupant to manually set a blowing mode.

The air-conditioning controller 40 is integrally structured with a control unit for controlling the operation of each of various air-conditioning control devices connected to the output side of the controller. A structure (hardware and software) adapted to control the operation of each of the air-conditioning control devices serves as the control unit for controlling the operation of the corresponding air-conditioning control device.

For example, in this embodiment, a structure for controlling the operation (refrigerant discharge capacity) of the compressor 11 configures a discharge capacity control unit 40a; a structure for controlling the operations of the first three-way valve 12a, second three-way valve 12b, and opening/closing mechanism 14b of the branch function-equipped three-way valve 14, all of which serve as the refrigerant-circuit switching portions, configures a refrigerant circuit control unit 40b. A structure for controlling the operation of the exterior expansion valve 17a configures an exterior decompression control unit 40c; and a structure for controlling the operation of the interior expansion valve 17b configures an interior decompression control unit 40d.

It is apparent that the discharge capacity control unit 40a, the refrigerant circuit control unit 40b, the exterior decompression control unit 40c, and the interior decompression control unit 40d, and the like may be configured as controllers separated from the air-conditioning controller 40.

Now, the operation of the vehicle air conditioner 1 with the above-mentioned structure in this embodiment will be described. As mentioned above, the vehicle air conditioner 1 in this embodiment can switch between the operation in the air-cooling mode and the operation in the dehumidification heating mode. Switching between these operation modes is performed by executing the air-conditioning control program pre-stored in the air-conditioning controller 40.

This air-conditioning control program starts to be executed when the automatic switch on the operation panel 60 is turned on. More specifically, a main routine of the air-conditioning control program involves reading the detection signals from the air-conditioning control group of sensors 51 to 57 and the operation signal and the like from the operation panel 60. Then, based on the read detection signal and operation signal, a target air temperature TAO, which is a target temperature of the ventilation air to be blown into the vehicle interior, is calculated.

Specifically, the target air outlet temperature TAO is calculated by the following formula F1:

$$TAO = Kset \times Tset - Kr \times Tr - Kam \times Tam - Ks \times As + C \quad (F1)$$

where Tset is a vehicle interior preset temperature set by the temperature setting switch, Tr is a vehicle interior temperature (inside air temperature) detected by the inside-air sensor 51, Tam is the outside air temperature detected by the outside-air sensor 52, As is an amount of solar radiation detected by the solar radiation sensor 53, Kset, Kr, Kam, and Ks are control gains, and C is a constant for correction.

When the air-cooling switch on the operation panel is turned on, and the target air outlet temperature TAO is lower than a predetermined reference air-cooling temperature α, the operation in the air-cooling mode is executed. In contrast, when the air-cooling switch is turned on, and the target air outlet temperature TAO is equal to or higher than the reference air-cooling temperature α, the operation in the dehumidification heating mode is executed. The operation in each operation mode will be described below.

(a) Air-Cooling Mode

In the air-cooling mode, the air-conditioning controller 40 controls the operation of the first three-way valve 12a to connect the discharge port side of the compressor 11 to one inflow/outflow port of the second three-way valve 12b, and also controls the operation of the second three-way valve 12b to connect another inflow/outflow port of the first three-way valve 12a to one refrigerant inflow/outflow port of the exterior heat exchanger 15.

Furthermore, the air-conditioning controller 40 controls the operation of the opening/closing mechanism 14b of the branch function-equipped three-way valve 14 so as to connect the other inflow/outflow port of the high-pressure side refrigerant passage 18a to one inflow/outflow port of the interior expansion valve 17b; fully opens the exterior expansion valve 17a; and throttles the interior expansion valve 17b to exhibit a refrigerant decompression function.

Thus, in the air-cooling mode, as indicated by solid arrows in FIG. 1, a refrigeration cycle is configured that allows the refrigerant to circulate through the compressor 11, (the first three-way valve 12a, the second three-way valve 12b), the exterior heat exchanger 15, (the exterior expansion valve 17a), the high-pressure side refrigerant passage 18a of the internal heat exchanger 18, (the branch function-equipped three-way valve 14), the interior expansion valve 17b, the interior evaporator 19, the evaporation-pressure adjustment valve 20, (three-way joint 16), the accumulator 21, the low-pressure side refrigerant passage 18b of the internal heat exchanger 18, and the suction port side of the compressor 11 in this order.

This refrigerant circuit corresponds to a first refrigerant circuit described in the accompanied claims. Furthermore, the air-conditioning controller 40 with the configuration of this refrigerant circuit determines the operating state of each of various control target devices (control signal to be output to each control target device), based on the target air outlet temperature TAO, and the detection signals from the sensor group, and the like.

For example, a refrigerant discharge capacity of the compressor 11 (control signal to be output to the electric motor of the compressor 11) will be determined in the following way. Specifically, first, a target refrigerant evaporation temperature TEO in the interior evaporator 19 is determined based on the target air outlet temperature TAO with reference to a control map pre-stored in the air-conditioning controller 40.

More specifically, the target refrigerant evaporation temperature TEO is determined by the control map to decrease with decreasing target air outlet temperature TAO. Furthermore, the target refrigerant evaporation temperature TEO is determined by the control map to be equal to or higher than a reference frost-formation preventing temperature (for example, 1° C. or higher)

A control signal to be output to the electric motor of the compressor 11 is determined such that an evaporator temperature Tefin approaches a target evaporator outlet air temperature using a feedback control method, based on a deviation between the target evaporator outlet air temperature TEO and the evaporator temperature Tefin detected by the evaporator temperature sensor.

A throttle opening degree of the interior expansion valve 17b (control signal to be output to the interior expansion valve 17b) is determined with reference to a control map pre-stored in the air-conditioning controller 40 such that a degree of supercooling of the high-pressure side refrigerant flowing into the high-pressure side refrigerant passage 18a of the internal heat exchanger 18 approaches a target degree of supercooling that is defined to maximize a coefficient of performance (COP) of the cycle.

The opening degree of the air mix door 34 (the control signal to be output to the electric actuator of the air mix door 34) is determined such that the air mix door 34 fully opens the cold-air bypass passage 35, and that the whole flow rate of ventilation air having passed through the interior evaporator 19 passes through the cold-air bypass passage 35.

Note that in the air-cooling mode, the opening degree of the air mix door 34 may be controlled such that the ventilation-air temperature TAV detected by the ventilation-air temperature sensor 57 approaches the target air outlet temperature TAO.

The control signals and the like determined in the way described above are output to various control target devices. Then, until the stopping operation of the vehicle air conditioner 1 is requested by the operation panel, a control routine is repeated at every predetermined control cycle. The control routine involves reading the above-mentioned detection signal and operation signal, calculating the target air outlet temperature TAO, determining the operating states of the respective control target devices, and outputting the control voltage and control signal in this order. Such a control routine is also repeated in other operation modes in the same manner.

Therefore, in the refrigeration cycle device 10 during the air-cooling mode, the refrigerant discharged from the compressor 11 flows into the exterior heat exchanger 15. The refrigerant flowing into the exterior heat exchanger 15 exchanges heat with the outside air blown from the blower fan to have its enthalpy decreased. The refrigerant flowing out of the exterior heat exchanger 15 flows as a high-pressure side refrigerant into the high-pressure side refrigerant passage 18a of the internal heat exchanger 18.

The high-pressure side refrigerant flowing into the high-pressure side refrigerant passage 18a exchanges heat with a low-pressure side refrigerant circulating through the low-pressure side refrigerant passage 18b, thus decreasing its enthalpy. The refrigerant flowing out of the high-pressure side refrigerant passage 18a is decompressed by the interior expansion valve 17b and then flows into the interior evaporator 19.

The refrigerant flowing into the interior evaporator 19 absorbs heat from the ventilation air blown from the blower 32 to evaporate. In this way, the ventilation air is cooled. The refrigerant flowing out of the interior evaporator 19 flows into the accumulator 21 via the evaporation-pressure adjustment valve 20 to be separated into gas and liquid phase refrigerants. The gas-phase refrigerant separated by the accumulator 21 flows as the low-pressure side refrigerant into the low-pressure side refrigerant passage 18b of the internal heat exchanger 18.

The low-pressure side refrigerant flowing into the low-pressure side refrigerant passage 18b exchanges heat with a high-pressure side refrigerant circulating through the high-pressure side refrigerant passage 18a, increasing its enthalpy, and becomes the gas-phase refrigerant having a degree of superheat. The gas-phase refrigerant having a degree of superheat and flowing out of the low-pressure side refrigerant passage 18b is drawn into and compressed again by the compressor 11.

As mentioned above, the vehicle air conditioner 1 in the air-cooling mode blows the ventilation air cooled by the interior evaporator 19 of the refrigeration cycle device 10, into the vehicle interior, thereby enabling cooling of the vehicle interior.

Furthermore, in the refrigeration cycle device 10 switched to the refrigerant circuit for the air-cooling mode (first refrigerant circuit), the internal heat exchanger 18 exchanges heat between the refrigerant (high-pressure side refrigerant) flowing out of the exterior heat exchanger 15 and the gas-phase refrigerant (low-pressure side refrigerant) flowing out of the accumulator 21, thus enlarging a difference in enthalpy (refrigeration capacity) between the outlet and inlet-side refrigerants of the interior evaporator 19, thereby improving the COP of the cycle.

At this time, in the internal heat exchanger 18, the flow rate (mass flow rate) of the high-pressure side refrigerant circulating through the high-pressure side refrigerant passage becomes substantially equal to that of the low-pressure side refrigerant circulating through the low-pressure side refrigerant passage. Thus, the refrigerant flowing into the interior evaporator 19 can be prevented from becoming a liquid-phase refrigerant having an unnecessarily high degree of supercooling.

As a result, like this embodiment, even when using the interior evaporator 19 configured of the tank and tube heat exchanger, the distributivity of the refrigerant in the interior evaporator 19 can be prevented from being degraded, thus suppressing the occurrence of a temperature distribution in the ventilation air cooled by the interior evaporator 19.

(b) Dehumidification Heating Mode

In the dehumidification heating mode, the air-conditioning controller 40 controls the operation of the first three-way valve 12a to connect the discharge port side of the compressor 11 to the refrigerant inlet side of the interior radiator 13. Furthermore, the air-conditioning controller 40 also controls the operation of the second three-way valve 12b to connect one refrigerant inflow/outflow port of the exterior heat exchanger 15 to one refrigerant inflow port of the three-way joint 16.

Furthermore, the air-conditioning controller 40 controls the operation of the opening/closing mechanism 14b of the branch function-equipped three-way valve 14 to allow the passage formation portion 14a of the branch function-equipped three-way valve 14 to function as the above-mentioned branch portion, thereby throttling both the exterior expansion valve 17a and the interior expansion valve 17b.

Figure 2:
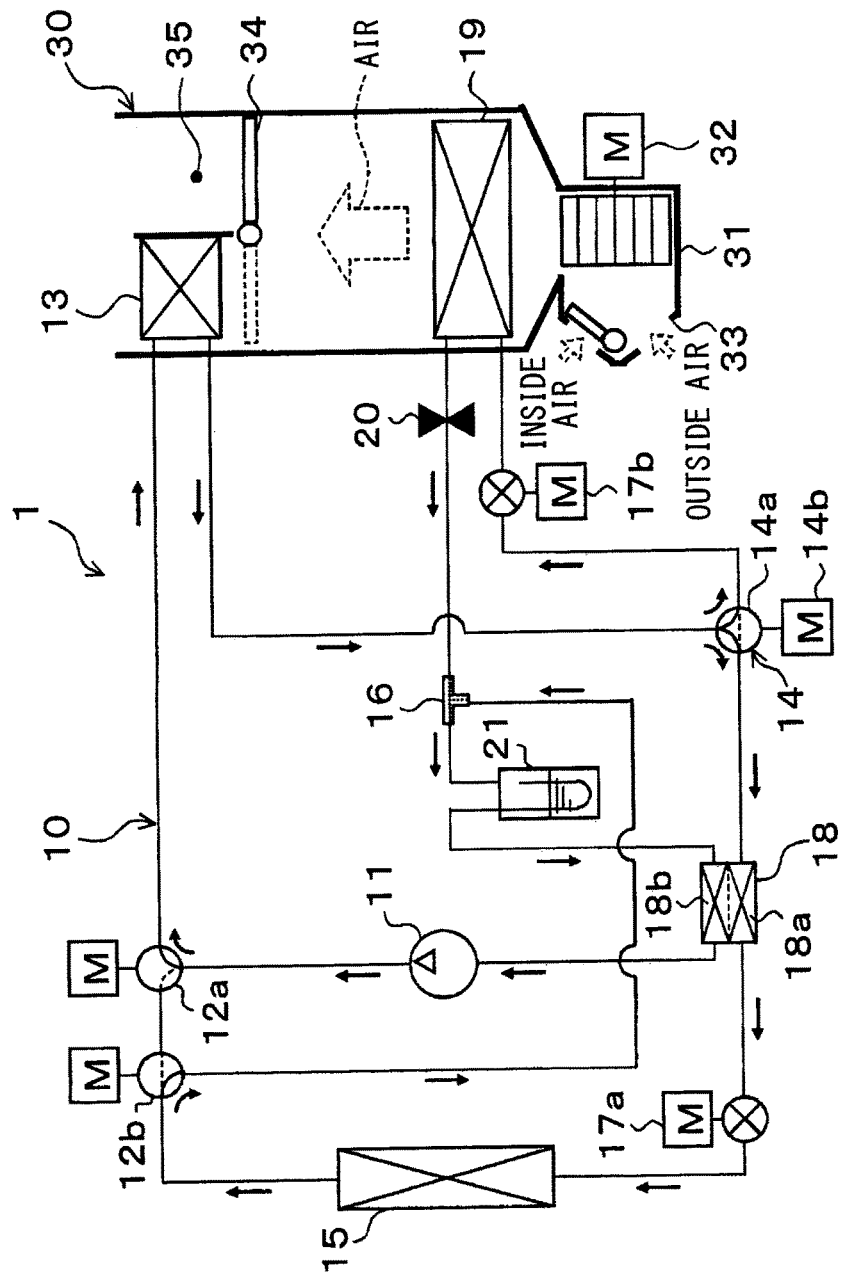
FIG. 2 is an entire configuration diagram of the vehicle air conditioner, showing the flow of the refrigerant in the refrigeration cycle device in a dehumidification heating mode according to the first embodiment.

Thus, in the dehumidification heating mode, as indicated by solid arrows of FIG. 2, a refrigeration cycle is configured that allows the refrigerant to circulate through the compressor 11, (first three-way valve 12a), interior radiator 13, passage formation portion 14a of the branch function-equipped three-way valve 14, interior expansion valve 17b, interior evaporator 19, evaporation-pressure adjustment valve 20, three-way joint 16, accumulator 21, low-pressure side refrigerant passage 18b of the internal heat exchanger 18, and the compressor 11 in this order. At the same time, the refrigeration cycle is also configured that allows the refrigerant to circulate through the compressor 11, interior radiator 13, passage formation portion 14a of the branch function-equipped three-way valve 14, high-pressure side refrigerant passage 18a of the internal heat exchanger 18, exterior expansion valve 17a, exterior heat exchanger 15, (second three-way valve 12b), three-way joint 16, accumulator 21, low-pressure side refrigerant passage 18b of the internal heat exchanger 18, and compressor 11 in this order.

This refrigerant circuit in the dehumidification heating mode corresponds to a second refrigerant circuit described in the accompanied claims. With the refrigerant circuit structure, the air-conditioning controller 40 determines the operating states of the respective control target devices based on the target air outlet temperature TAO and the detection signals from the sensor group.

For example, a refrigerant discharge capacity of the compressor 11 (control signal to be output to the electric motor of the compressor 11) will be determined in the following way. First, a target condensation pressure PCO in the interior radiator 13 is determined based on the target air outlet temperature TAO with reference to the control map pre-stored in the air-conditioning controller 40. More specifically, the target condensation pressure PCO is determined by the control map to increase with increasing target air outlet temperature TAO.

A control signal to be output to the electric motor of the compressor 11 is determined by the feedback control method based on a deviation between the target condensation pressure PCO and the high-pressure side refrigerant pressure Pd detected by the high-pressure side pressure sensor 55 such that the high-pressure side refrigerant pressure Pd approaches the target condensation pressure PCO.

A throttle opening degree of the exterior expansion valve 17a (control signal to be output to the exterior expansion valve 17a) and a throttle opening degree of the interior expansion valve 17b (control signal to be output to the interior expansion valve 17b) are determined such that a degree of supercooling of the refrigerant flowing out of the branch function-equipped three-way valve 14 (that is, the refrigerant flowing into the interior expansion valve 17b) approaches a target degree of supercooling defined to maximize the COP.

The throttle opening degree of the interior expansion valve 17b is determined such that the flow rate (mass flow rate) of the refrigerant flowing into the interior evaporator 19 becomes a predetermined appropriate flow rate. In this embodiment, the evaporation-pressure adjustment valve 20 is disposed on the downstream side of the refrigerant flow relative to the interior evaporator 19, so that the throttle opening degree of the interior expansion valve 17b becomes larger than that of the exterior expansion valve 17a.

The opening degree of the air mix door 34 (the control signal to be output to the electric actuator for the air mix door 34) is determined such that the air mix door 34 completely closes the cold-air bypass passage 35, and that the whole ventilation air having passed through the interior evaporator 19 flows through the air passage on the interior radiator 13 side.

Figure 4:
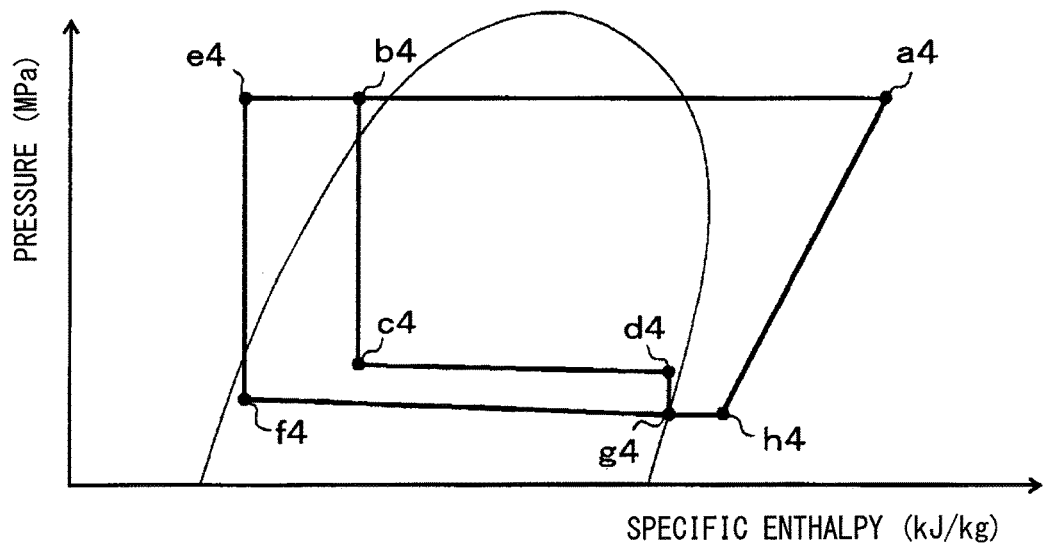
FIG. 4 is a Mollier diagram showing changes in the state of the refrigerant in the refrigeration cycle device in the dehumidification heating mode of the first embodiment.

Thus, in the refrigeration cycle device 10 of the dehumidification heating mode, the state of the refrigerant changes as illustrated in the Mollier chart of FIG. 4. That is, the refrigerant discharged from the compressor (as indicated by point a4 in FIG. 4) flows into the interior radiator 13 and exchanges heat with the ventilation air cooled and dehumidified by the interior evaporator 19 to dissipate its heat (as indicated from point a4 to point b4 in FIG. 4). In this way, the ventilation air is heated.

Further, the flow of the refrigerant from the interior radiator 13 is branched by the branch function-equipped three-way valve 14. One refrigerant branched by the branch function-equipped three-way valve 14 is decompressed by the interior expansion valve 17b (as indicated from point b4 to point c4 in FIG. 4). The low-pressure refrigerant decompressed by the interior expansion valve 17b flows into the interior evaporator 19 and absorbs heat from the ventilation air blown from the blower 32 to evaporate (as indicated from point c4 to point d4 in FIG. 4). In this way, the ventilation air is cooled.

Further, the refrigerant flowing out of the interior evaporator 19 is decompressed by the evaporation-pressure adjustment valve 20 to have substantially the same pressure as that of the refrigerant flowing out of the exterior heat exchanger 15 (as indicated from point d4 to point g4 in FIG. 4). The refrigerant flowing out of the evaporation-pressure adjustment valve 20 enters the three-way joint 16 to be merged with the refrigerant flowing out of the exterior heat exchanger 15.

The other refrigerant branched by the branch function-equipped three-way valve 14 flows as the high-pressure side refrigerant into the high-pressure side refrigerant passage 18a of the internal heat exchanger 18. The high-pressure side refrigerant flowing into the high-pressure side refrigerant passage 18a exchanges heat with the low-pressure side refrigerant circulating through the low-pressure side refrigerant passage 18b, further decreasing its enthalpy (as indicated from point b4 to point e4 in FIG. 4).

The refrigerant flowing out of the high-pressure side refrigerant passage 18a is decompressed by the exterior expansion valve 17a (as indicated from point e4 to point f4 in FIG. 4) and then flows into the exterior heat exchanger 15. The refrigerant flowing into the exterior heat exchanger 15 absorbs heat from the outside air blown from the blower fan to evaporate (as indicated from point f4 to point g4 in FIG. 4).

The refrigerant flowing out of the exterior heat exchanger 15 enters the three-way joint 16 to be merged with the refrigerant flowing out of the evaporation-pressure adjustment valve 20. The refrigerant flowing out of the three-way joint 16 flows into the accumulator 21 to be separated into gas and liquid phase refrigerants. The gas-phase refrigerant separated by the accumulator 21 flows as the low-pressure side refrigerant into the low-pressure side refrigerant passage 18b of the internal heat exchanger 18.

The low-pressure side refrigerant flowing into the low-pressure side refrigerant passage 18b exchanges heat with the high-pressure side refrigerant circulating through the high-pressure side refrigerant passage 18a, increasing its enthalpy, and becomes the gas-phase refrigerant having a degree of superheat (as indicated from point g4 to point h4 in FIG. 4). The gas-phase refrigerant having a degree of superheat and flowing out of the low-pressure side refrigerant passage 18b is drawn into and compressed again by the compressor 11 (as indicated from point h4 to point a4 in FIG. 4).

As mentioned above, in the vehicle air conditioner 1 in the dehumidification heating mode, the ventilation air cooled and dehumidified by the interior evaporator 19 of the refrigeration cycle device is reheated by the interior radiator 13 and blown out into the vehicle interior, thereby enabling the dehumidification heating of the vehicle interior.

Furthermore, in the refrigeration cycle device 10 switched to the refrigerant circuit for the dehumidification heating mode (second refrigerant circuit), heat exchange is carried out between the high-pressure side refrigerant branched by the passage formation portion 14a of the branch function-equipped three-way valve 14 and flowing on the upstream side of the exterior heat exchanger 15 and the low-pressure side refrigerant into which the refrigerants are merged in the three-way joint 16. Thus, the refrigeration capacity of the exterior heat exchanger 15 can be enhanced to improve the COP of the cycle. In this way, the heat for reheating the ventilation air in the exterior heat exchanger 15 can be effectively absorbed from the outside air.

At this time, in the internal heat exchanger 18, the flow rate (mass flow rate) of the high-pressure side refrigerant circulating through the high-pressure side refrigerant passage 18a becomes lower than that of the low-pressure side refrigerant circulating through the low-pressure side refrigerant passage 18b. Thus, although the refrigerant flowing into the exterior heat exchanger 15 could be a liquid-phase refrigerant having a high degree of supercooling, the refrigerant flowing into the interior evaporator 19 does not become a liquid-phase refrigerant that has an unnecessarily high degree of supercooling.

Therefore, like in the air-cooling mode, the refrigeration cycle device in the dehumidification heating mode can suppress the degradation in distributivity of the refrigerant in the interior evaporator 19, thus preventing the occurrence of a temperature distribution in the ventilation air cooled by the interior evaporator 19. Consequently, the refrigeration cycle device 10 in this embodiment can achieve the appropriate dehumidification heating of the space to be air-conditioned.

Like this embodiment, the internal heat exchanger 18 is configured such that the passage cross-sectional area of the high-pressure side refrigerant passage 18a is formed to be smaller than that of the low-pressure side refrigerant passage 18b. In such an internal heat exchanger 18, the flow rate (mass flow rate) Gr of the refrigerant circulating through the high-pressure side refrigerant passage 18a tends to drastically change depending on the state of the inlet-side refrigerant flowing into the high-pressure side refrigerant passage 18a.

Figure 5:
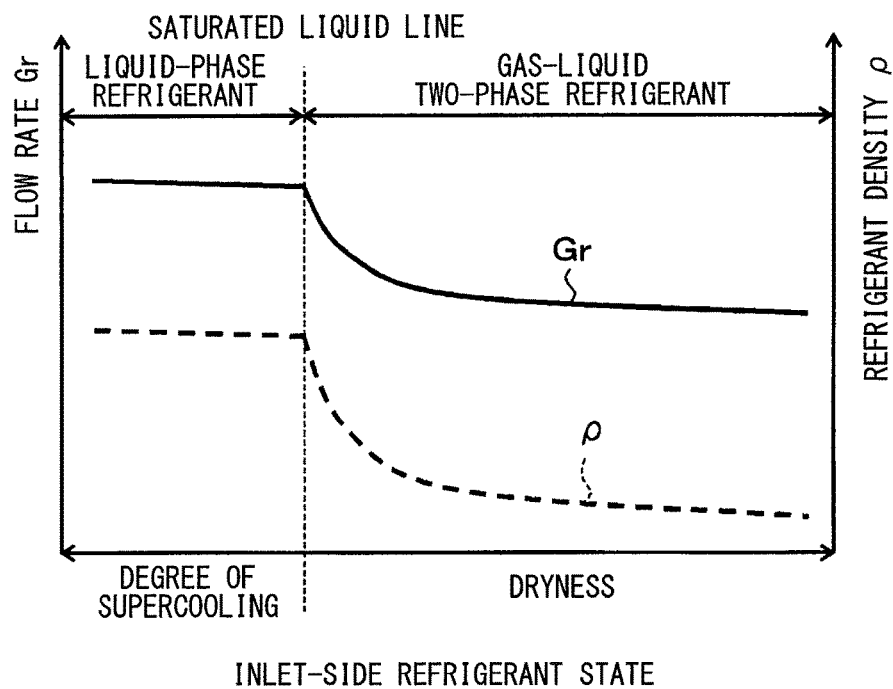
FIG. 5 is a graph showing the flow rate and refrigerant density in relation to the state of an inlet-side refrigerant in the high-pressure side refrigerant passage of the internal heat exchanger in the first embodiment.

Specifically, as shown in a graph of FIG. 5, when the inlet-side refrigerant is a gas-liquid two-phase refrigerant, the refrigerant density ρ of the inlet-side refrigerant is lowered more than when the inlet-side refrigerant is a liquid-phase refrigerant. Thus, if the inlet-side refrigerant is converted from the liquid-phase refrigerant into the gas-liquid two-phase refrigerant due to variations in load on the cycle and the like, the flow rate Gr will decrease significantly.

Note that the flow rate Gr is defined by formula F2 below.

$$Gr = A \times (2 \times \rho \times \Delta P)^{0.5} \tag{F2}$$

where A is a passage cross-sectional area of the high-pressure side refrigerant passage 18a; and ΔP is a pressure difference obtained by subtracting a pressure of the outlet-side refrigerant in the high-pressure side refrigerant passage 18a from a pressure of the inlet-side refrigerant in the passage 18a.

In contrast, in the refrigeration cycle device 10 of this embodiment, the high-pressure side refrigerant passage 18a of the internal heat exchanger 18 is disposed in the refrigerant flow path that leads from the passage formation portion 14a of the branch function-equipped three-way valve 14 to the other refrigerant inflow/outflow port of the exterior heat exchanger 15 when switching to the refrigerant circuit for the dehumidification heating mode.

Accordingly, the flow rate of the refrigerant flowing out of the passage formation portion 14a of the branch function-equipped three-way valve 14 into the interior evaporator 19 side can be prevented from decreasing significantly, even though the state of the inlet-side refrigerant changes depending on variations in load on the cycle and the like. As a result, the shortage of the flow rate of the refrigerant circulating through the interior evaporator 19 is suppressed and thus can achieve more appropriate dehumidification heating of the space to be air-conditioned.

The refrigeration cycle device 10 in this embodiment includes the accumulator 21, and thus can convert the refrigerant entering the low-pressure side refrigerant passage 18b of the internal heat exchanger 18, into a saturated gas-phase refrigerant. Thus, the refrigerant flowing out of the low-pressure side refrigerant passage 18b can be surely converted into the gas-phase refrigerant having a degree of superheat, thereby preventing the liquid compression in the compressor 11.

The refrigeration cycle device 10 in this embodiment includes the evaporation-pressure adjustment valve 20 and thus can suppress the frost formation (frost) on the interior evaporator 19. In the dehumidification heating mode, the refrigerant evaporation temperature in the exterior heat exchanger 15 can be reduced, compared to the refrigerant evaporation temperature in the interior evaporator 19, thereby increasing the amount of heat absorbed by the refrigerant in the exterior heat exchanger 15, thus increasing the heating capacity of the interior radiator 13 for the ventilation air.

Second Embodiment

Figure 6:
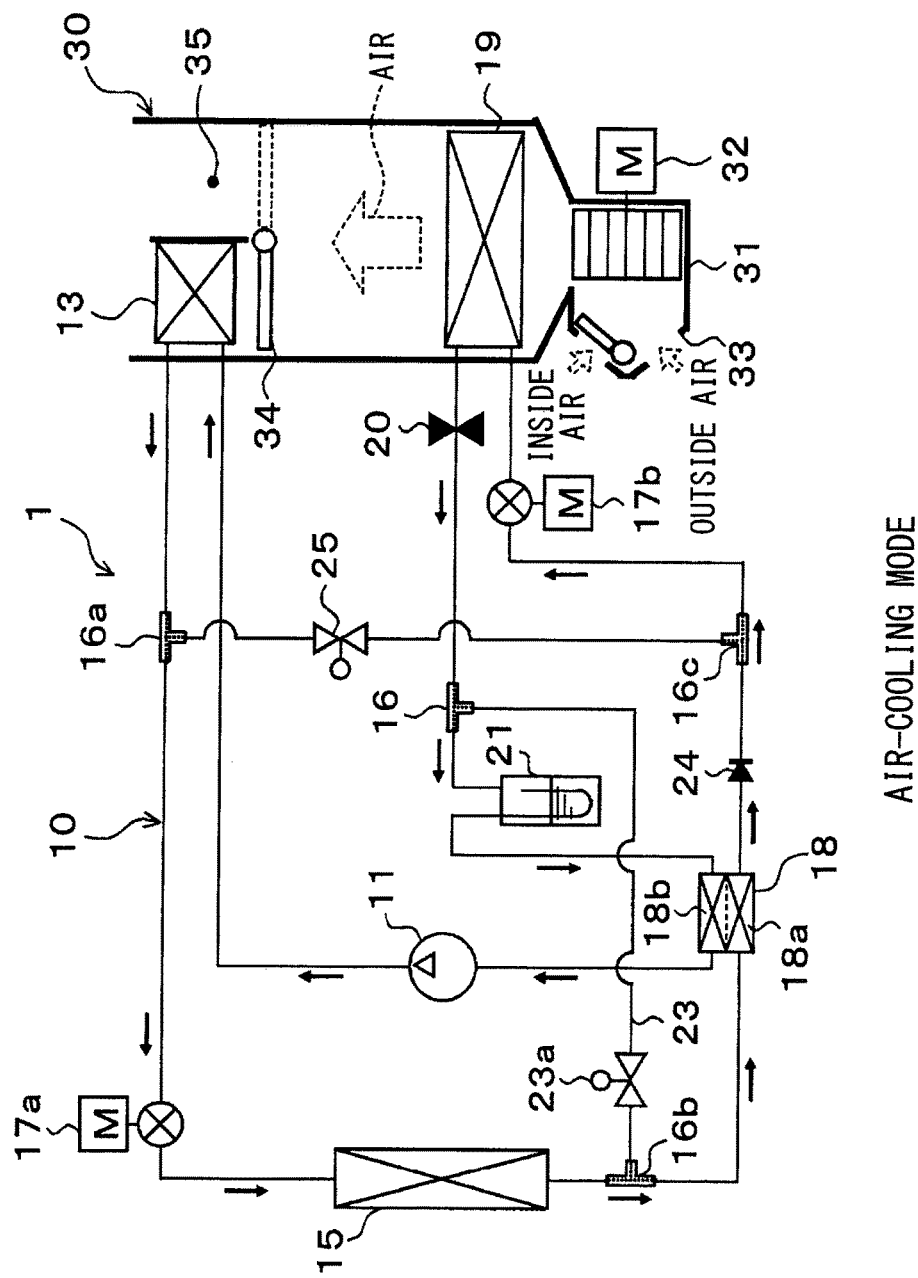
FIG. 6 is an entire configuration diagram of a vehicle air conditioner, showing the flow of a refrigerant in a refrigeration cycle device in an air-cooling mode according to a second embodiment.
Figure 7:
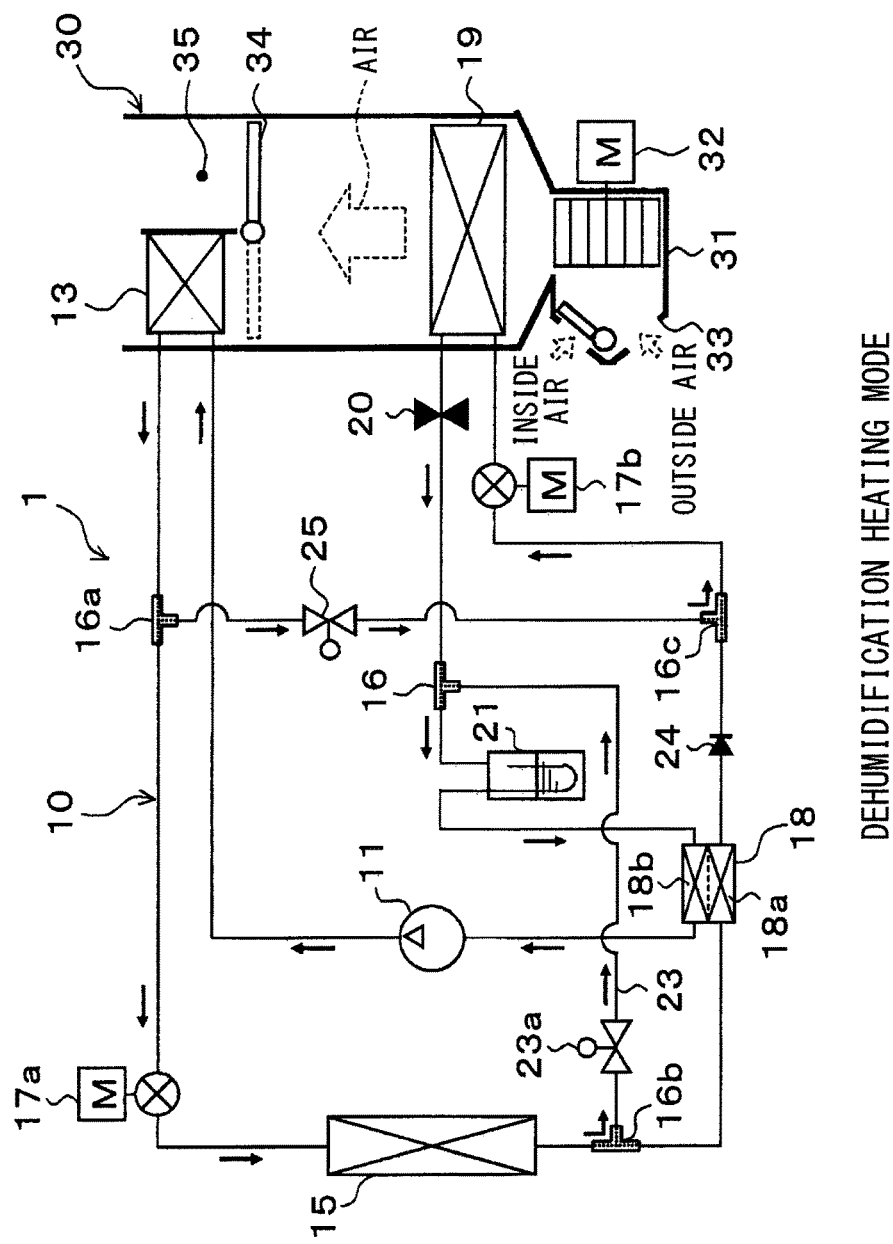
FIG. 7 is an entire configuration diagram of the vehicle air conditioner, showing the flow of the refrigerant in the refrigeration cycle device in a dehumidification heating mode according to the second embodiment.

This embodiment will describe an example in which the circuit configuration of the refrigeration cycle device 10 is changed from that of the first embodiment, as illustrated in entire configuration diagrams of FIGS. 6 and 7.

Specifically, the discharge port of the compressor 11 in this embodiment is connected to the refrigerant inlet side of the interior radiator 13. The refrigerant outlet side of the interior radiator 13 is connected to the refrigerant inflow port side of a second three-way joint 16a serving as a branch portion that branches the flow of refrigerant from the interior radiator 13. The second three-way joint 16a has substantially the same basic structure as that of the three-way joint 16 described in the first embodiment.

In more detail, the second three-way joint 16a uses two of three refrigerant inflow ports as the refrigerant outflow ports and the remaining one as the refrigerant inflow port. Note that in the description below, to clarify the explanation, the three-way joint 16 is hereinafter referred to as a first three-way joint 16. Furthermore, a third three-way joint 16b and a fourth three-way joint 16c, as described later, have substantially the same basic structure as that of the first three-way joint 16.

One refrigerant outflow port side of the second three-way joint 16a is connected to the refrigerant inflow port side of the exterior heat exchanger 15 via the exterior expansion valve 17a. The refrigerant outflow port side of the exterior heat exchanger 15 is connected to a refrigerant inflow port side of the third three-way joint 16b.

One refrigerant outflow port side of the third three-way joint 16b is connected to one refrigerant inflow port side of the first three-way joint 16 via a bypass passage 23. In at least the dehumidification heating mode, the bypass passage 23 is a refrigerant passage that allows the refrigerant exiting the exterior heat exchanger 15 to flow into the inlet side of the accumulator 21, while bypassing the high-pressure side refrigerant passage 18a of the internal heat exchanger 18.

In the bypass passage 23, a bypass passage on-off valve 23a is disposed as an opening/closing device for opening and closing the bypass passage 23. The bypass passage 23 is an electromagnetic valve that has its operation controlled by a control voltage output from the air-conditioning controller 40.

The other refrigerant outflow port of the third three-way joint 16b is connected to the inlet side of the high-pressure side refrigerant passage 18*a* of the internal heat exchanger 18. The outlet side of the high-pressure side refrigerant passage 18*a* is connected to one refrigerant inflow port of the fourth three-way joint 16*c* via a check valve 24. The check valve 24 serves to allow the refrigerant to flow through only a path from the outlet side of the high-pressure side refrigerant passage 18*a* to the fourth three-way joint 16*c* side.

The refrigerant outflow port of the fourth three-way joint 16*c* is connected to the refrigerant inlet side of the interior evaporator 19 via the interior expansion valve 17*b*.

The other refrigerant outflow port side of the second three-way joint 16*a* is connected to the other refrigerant inflow port side of the fourth three-way joint 16*c*. An on-off valve 25 is disposed in a refrigerant passage that connects the other refrigerant outflow port of the second three-way joint 16*a* to the other refrigerant inflow port of the fourth three-way joint 16*c*. The on-off valve 25 serves as a refrigerant circuit switching portion for switching the refrigerant circuit by opening and closing the refrigerant passage. The on-off valve 25 has substantially the same basic structure as that of the bypass passage on-off valve 23*a*.

Figure 8:
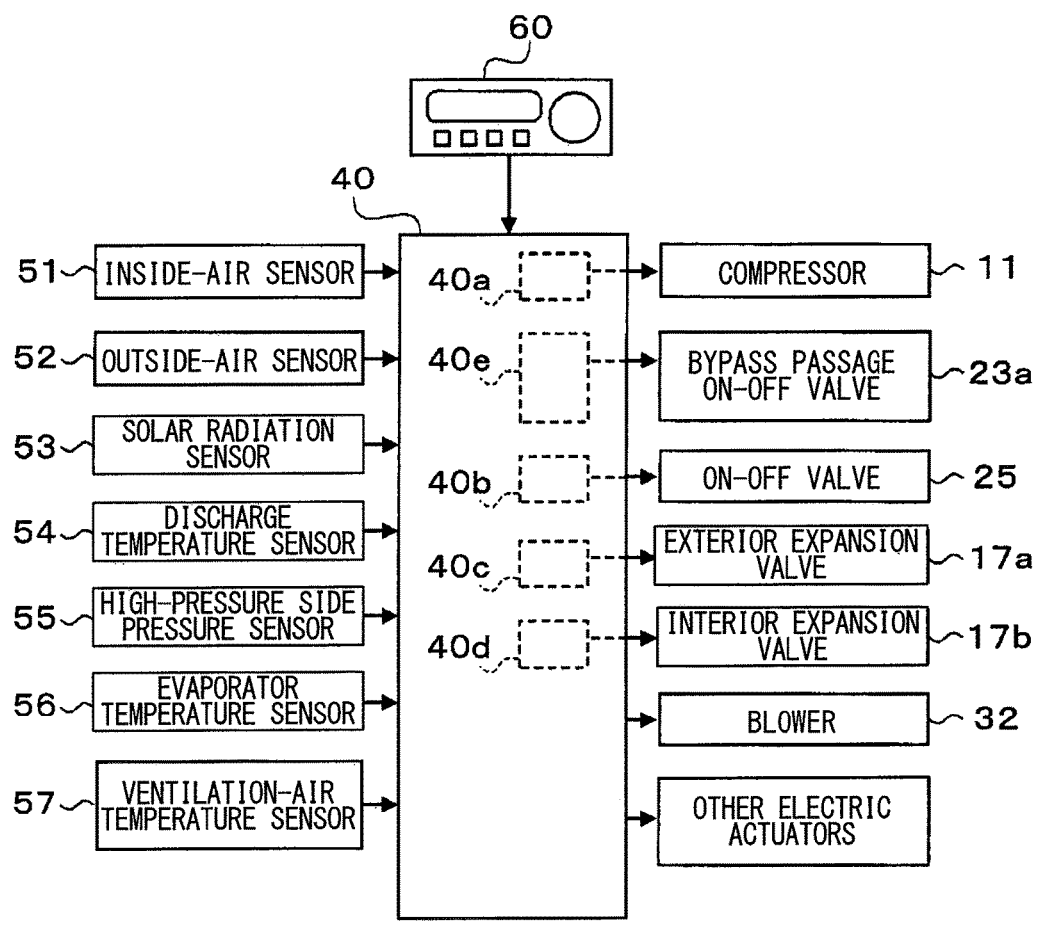
FIG. 8 is a block diagram showing an electric control unit of the vehicle air conditioner in the second embodiment.

As can be seen from the above description, the refrigeration cycle device 10 in this embodiment removes the first three-way valve 12*a*, second three-way valve 12*b*, and branch function-equipped three-way valve 14 which serve as the refrigerant circuit switching portions in the first embodiment. Thus, as shown in FIG. 8, in the air-conditioning controller 40 of this embodiment, a structure for controlling the operation of the on-off valve 25 configures the refrigerant circuit control unit 40*b*. A structure for controlling the operation of the bypass passage on-off valve 23*a* configures a bypass passage control unit 40*e*.

The structures of other components in the refrigeration cycle device 10 and the interior air-conditioning unit 30 are the same as those in the first embodiment.

Now, the operation of the vehicle air conditioner 1 with the above-mentioned structure in this embodiment will be described. The basic operation of the vehicle air conditioner 1 in this embodiment is substantially the same as that in the first embodiment. Therefore, the vehicle air conditioner 1 in this embodiment can switch between the operation in the air-cooling mode and the operation in the dehumidification heating mode.

(a) Air-Cooling Mode

In the air-cooling mode of this embodiment, the air-conditioning controller 40 closes the on-off valve 25, closes the bypass passage on-off valve 23*a*, fully opens the exterior expansion valve 17*a*, and brings the interior expansion valve 17*b* into a throttle state of exhibiting the substantially same refrigerant decompression effect as that in the air-cooling mode of the first embodiment.

Thus, in the air-cooling mode, as indicated by solid arrows in FIG. 6, the refrigeration cycle is configured that allows the refrigerant to circulate through the compressor 11, (interior radiator 13, second three-way joint 16*a*, exterior expansion valve 17*a*), the exterior heat exchanger 15, (third three-way joint 16*b*), the high-pressure side refrigerant passage 18*a* of the internal heat exchanger 18, (check valve 24, fourth three-way joint 16*c*), the interior expansion valve 17*b*, the interior evaporator 19, the evaporation-pressure adjustment valve 20, (first three-way joint 16), the accumulator 21, the low-pressure side refrigerant passage 18*b* of the internal heat exchanger 18, and the suction port side of the compressor 11 in this order.

This refrigerant circuit corresponds to a third refrigerant circuit described in the accompanying claims. With the refrigerant circuit structure, the air-conditioning controller 40 determines the operating states of the respective control target devices based on the target air outlet temperature TAO and the detection signals from the sensor group in the same way as in the air-cooling mode of the first embodiment.

Therefore, in the refrigeration cycle device 10 during the air-cooling mode, the refrigerant discharged from the compressor 11 flows into the interior radiator 13. In the air-cooling mode, the air mix door 34 fully opens the cold-air bypass passage 35, whereby the refrigerant flowing into the interior radiator 13 flows out of the interior radiator 13 without dissipating heat into the ventilation air.

The refrigerant flowing out of the interior radiator 13 flows into the exterior heat exchanger 15 via the second three-way joint 16*a* and the exterior expansion valve 17*a* fully opened. The refrigerant flowing into the exterior heat exchanger 15 exchanges heat with the outside air blown from the blower fan to have its enthalpy decreased. The refrigerant flowing out of the exterior heat exchanger 15 flows as a high-pressure side refrigerant into the high-pressure side refrigerant passage 18*a* of the internal heat exchanger 18.

The high-pressure side refrigerant flowing into the high-pressure side refrigerant passage 18*a* exchanges heat with a low-pressure side refrigerant circulating through the low-pressure side refrigerant passage 18*b*, thus decreasing its enthalpy. The refrigerant flowing out of the high-pressure side refrigerant passage 18*a* flows into the interior expansion valve 17*b* via the check valve 24 and the fourth three-way joint 16*c*.

The refrigerant decompressed by the interior expansion valve 17*b* flows into the interior evaporator 19 and absorbs heat from the ventilation air blown from the blower 32 to evaporate itself. In this way, the ventilation air is cooled. The following operations are the same as those in the first embodiment.

As mentioned above, the vehicle air conditioner 1 in the air-cooling mode blows the ventilation air cooled by the interior evaporator 19 of the refrigeration cycle device 10, into the vehicle interior, thereby enabling the air-cooling of the vehicle interior. Thus, the vehicle air conditioner 1 of this embodiment has the same effects as those in the first embodiment.

(b) Dehumidification Heating Mode

In the dehumidification heating mode of this embodiment, the air-conditioning controller 40 opens the on-off valve 25, opens the bypass passage on-off valve 23*a*, and brings the exterior expansion valve 17*a* and the interior expansion valve 17*b* into a throttle state of exhibiting the substantially same refrigerant decompression effect as that in the dehumidification heating mode of the first embodiment.

Thus, in the dehumidification heating mode, as indicated by solid arrows of FIG. 7, a refrigeration cycle is configured that allows the refrigerant to circulate through the compressor 11, interior radiator 13, second three-way joint 16*a*, (on-off valve 25, fourth three-way joint 16*c*), interior expansion valve 17*b*, interior evaporator 19, evaporation-pressure adjustment valve 20, first three-way joint 16, accumulator 21, low-pressure side refrigerant passage 18*b* of the internal heat exchanger 18, and the compressor 11 in this way. At the same time, the refrigeration cycle is also configured that allows the refrigerant to circulate through the compressor 11, interior radiator 13, second three-way joint 16*a*, exterior expansion valve 17*a*, exterior heat exchanger 15, (third three-way joint 16*b*, bypass passage 23), first three-way joint 16, accumulator 21, low-pressure side refrigerant passage 18*b* of the internal heat exchanger 18, and compressor 11 in this order.

The refrigerant circuit in the dehumidification heating mode corresponds to a fourth refrigerant circuit described in the accompanied claims. With the refrigerant circuit structure, the air-conditioning controller 40 determines the operating states of the respective control target devices based on the target air outlet temperature TAO and the detection signals from the sensor group, in the same way as that in the dehumidification heating mode of the first embodiment.

Figure 9:
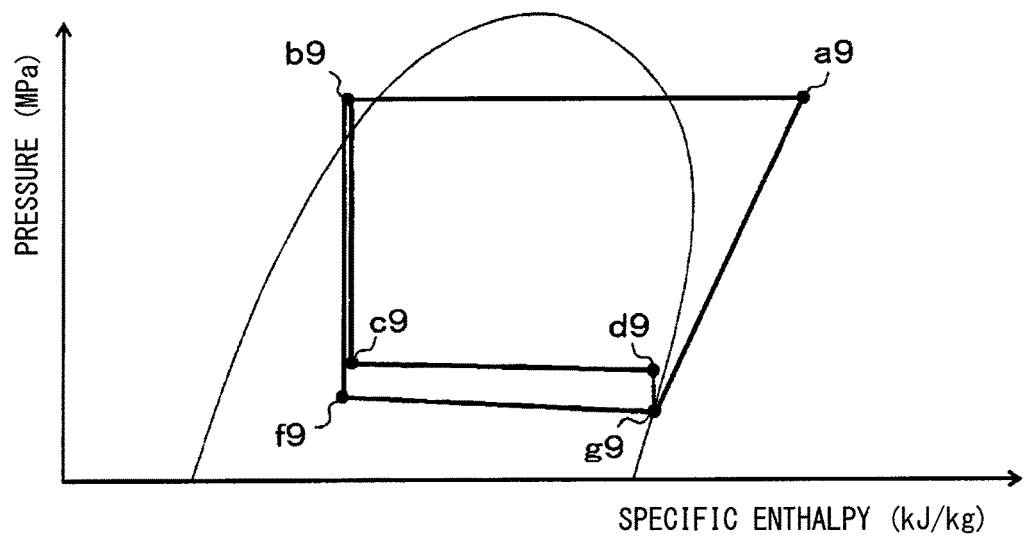
FIG. 9 is a Mollier diagram showing changes in the state of the refrigerant in the refrigeration cycle device in the dehumidification heating mode of the second embodiment.

Thus, in the refrigeration cycle device 10 of the dehumidification heating mode, the state of the refrigerant changes as illustrated in the Mollier chart of FIG. 9. That is, the refrigerant discharged from the compressor 11 (as indicated by point a9 in FIG. 9) flows into the interior radiator 13 and exchanges heat with the ventilation air cooled and dehumidified by the interior evaporator 19 to dissipate its heat (as indicated from point a9 to point b9 in FIG. 9). In this way, the ventilation air is heated.

The flow of refrigerant flowing out of the interior radiator 13 is branched by the second three-way joint 16a because the on-off valve 25 is open. The refrigerant flowing out of the other refrigerant outflow port of the second three-way joint 16a flows into and is then decompressed by the interior expansion valve 17b via the fourth three-way joint 16c (as indicated from point b9 to point c9 in FIG. 9). At this time, the function of the check valve 24 prevents the refrigerant from flowing out of the fourth three-way joint 16c toward the high-pressure side refrigerant passage 18a of the internal heat exchanger 18.

The low-pressure refrigerant decompressed by the interior expansion valve 17b flows into the interior evaporator 19 and absorbs heat from the ventilation air blown from the blower 32 to evaporate (as indicated from point c9 to point d9 in FIG. 9). In this way, the ventilation air is cooled.

Further, the refrigerant flowing out of the interior evaporator 19 is decompressed by the evaporation-pressure adjustment valve 20 to have substantially the same pressure as that of the refrigerant flowing out of the exterior heat exchanger 15 (as indicated from point d9 to point g9 in FIG. 9). The refrigerant flowing out of the evaporation-pressure adjustment valve 20 enters the first three-way joint 16 to be merged with the refrigerant flowing out of the exterior heat exchanger 15.

The refrigerant flowing out of one refrigerant outflow port of the second three-way joint 16a is decompressed by the exterior expansion valve 17a (as indicated from point b9 to point f9 in FIG. 9) and then flows into the exterior heat exchanger 15. The refrigerant decompressed by the exterior expansion valve 17a flows into the exterior heat exchanger 15 to absorb heat from the outside air blown from the blower fan (as indicated from point f9 to point g9 in FIG. 9).

The refrigerant flowing out of the exterior heat exchanger 15 flows into the first three-way joint 16 via the bypass passage 23 because the bypass passage on-off valve 23a is opened, and is then merged with the refrigerant flowing out of the evaporation-pressure adjustment valve 20. The refrigerant flowing out of the three-way joint 16 flows into the accumulator 21 to be separated into gas and liquid phase refrigerants. The gas-phase refrigerant separated by the accumulator 21 flows into the low-pressure side refrigerant passage 18b of the internal heat exchanger 18.

At this time, no high-pressure side refrigerant circulates through the high-pressure side refrigerant passage 18a of the internal heat exchanger 18, whereby the refrigerant entering the low-pressure side refrigerant passage 18b just flows out of the low-pressure side refrigerant passage 18b without increasing its enthalpy. The gas-phase refrigerant flowing out of the low-pressure side refrigerant passage 18b is drawn into and compressed again by the compressor 11 (as indicated from point g9 to point a9 in FIG. 9).

As mentioned above, in the vehicle air conditioner 1 in the dehumidification heating mode, the ventilation air cooled and dehumidified by the interior evaporator 19 of the refrigeration cycle device 10 is reheated by the interior radiator 13 and blown out into the vehicle interior, thereby enabling the dehumidification heating of the vehicle interior.

Furthermore, in the refrigeration cycle device 10 switched to the refrigerant circuit (fourth refrigerant circuit) in the dehumidification heating mode, the bypass passage on-off valve 23a opens the bypass passage 23, thereby avoiding the heat exchange between the high-pressure and low-pressure side refrigerants in the internal heat exchanger 18. Thus, the refrigerant flowing into the interior evaporator 19 can be prevented from becoming a liquid-phase refrigerant having an excessively high degree of supercooling.

Therefore, like in the first embodiment, the degradation in distributivity of the refrigerant in the interior evaporator 19 can be suppressed, preventing the occurrence of a temperature distribution in the ventilation air cooled by the interior evaporator 19. Consequently, the refrigeration cycle device 10 in this embodiment can achieve the appropriate dehumidification heating of the space to be air-conditioned, and thus can obtain the same effects as those in the first embodiment.

Other Embodiments

The present disclosure is not limited to the above-mentioned embodiments, and various modifications and changes can be made to those embodiments without departing from the scope and spirit of the present disclosure.

(1) In the above-mentioned embodiments, the refrigeration cycle device 10 of the present disclosure is applied to the vehicle air conditioner 1 mounted on an electric vehicle by way of example. However, the application of the present disclosure is not limited thereto. For example, the refrigeration cycle device may be applied to a vehicle air conditioner mounted on a normal vehicle that obtains a driving force for traveling from an internal combustion engine (engine), or to a vehicle air conditioner mounted on a hybrid vehicle that obtains a driving force for traveling from both a traveling electric motor and the internal combustion engine.

In applying the refrigeration cycle device to a vehicle with an internal combustion engine, a heater core may be provided as an auxiliary heater for the ventilation air to heat the ventilation air using a coolant of the internal combustion engine as a heat source. The refrigeration cycle device 10 in the present disclosure is not limited to the application for vehicles, but may be applied to a stationary air conditioner and the like.

(2) The above-mentioned embodiments have described the refrigeration cycle device 10 in which the interior radiator 13 exchanges heat between the ventilation air and the refrigerant discharged from the compressor 11, thereby directly heating the ventilation air using the refrigerant discharged from the compressor 11 as a heat source. However, the heating form of the ventilation air by the interior radiator 13 is not limited thereto.

For example, a heat-medium circulation circuit for circulation of the heat medium may be provided, the interior radiator may serve as a coolant-refrigerant heat exchanger that exchanges heat between the refrigerant discharged from the compressor and the heat medium, and further a heating heat exchanger may be disposed in the heat-medium circulation circuit to heat the ventilation air by exchanging heat between the ventilation air and the heat medium heated by the interior radiator. That is, the interior radiator may indirectly heat the ventilation air via the heat medium, using the refrigerant discharged from the compressor (high-pressure side refrigerant in the cycle) as a heat source.

Further, when applying the refrigeration cycle device to vehicles with the internal combustion engines, the coolant in the internal combustion engine may be used as the heat medium to circulate through a heat-medium circulation circuit. In electric vehicles, the coolant for cooling a battery or an electric device may be used as a heat medium to circulate through a heat-medium circulation circuit.

(3) In the description of the embodiments above, the refrigeration cycle device 10 is configured to be switchable between the air-cooling mode and the dehumidification heating mode, but may be switchable to an air-heating mode of performing air-heating of the vehicle interior by heating the ventilation air.

For example, in the refrigeration cycle device 10 of the first embodiment, the branch function-equipped three-way valve 14 for use is one capable of connecting the refrigerant outlet side of the interior radiator 13 to the other inflow/outflow port of the high-pressure side refrigerant passage 18a, and the interior expansion valve 17b for use is one equipped with a full close function of completely closing the refrigerant passage.

In the air-heating mode, the refrigeration cycle device may be switched to a refrigerant circuit that allows the refrigerant to circulate through the compressor 11, (first three-way valve 12a), interior radiator 13, (branch function-equipped three-way valve 14), the high-pressure side refrigerant passage 18a of the internal heat exchanger 18, the exterior expansion valve 17a, the exterior heat exchanger 15, (second three-way valve 12b), the three-way joint 16, the accumulator 21, the low-pressure side refrigerant passage 18b of the internal heat exchanger 18, and the suction port side of the compressor 11 in this order.

In the refrigeration cycle device 10 of the second embodiment, the interior expansion valve 17b for use is one equipped with the full close function of completely closing the refrigerant passage.

In the air-heating mode, the refrigeration cycle device may be switched to a refrigerant circuit that allows the refrigerant to circulate through the compressor 11, the interior radiator 13, (second three-way joint 16a), the exterior expansion valve 17a, the exterior heat exchanger 15, (third three-way joint 16b, bypass passage 23), the first three-way joint 16, the accumulator 21, the low-pressure side refrigerant passage 18b of the internal heat exchanger 18, and the suction port side of the compressor 11 in this order.

Furthermore, the air-heating mode may be performed even when an air-cooling switch is not turned on as long as the target air outlet temperature TAO is equal to or higher than the air-cooling reference temperature $\alpha$.

(4) Although in the above-mentioned second embodiment, the bypass passage 23 is provided to allow the refrigerant to bypass the high-pressure side refrigerant passage 18a of the internal heat exchanger 18 by way of example, it is apparent that a bypass passage may be provided to allow the refrigerant to bypass the low-pressure side refrigerant passage 18b in the dehumidification heating mode. Furthermore, a plurality of bypass passages may be provided to allow the refrigerant to flow bypassing both the high-pressure and low-pressure side refrigerant passages 18a and 18b in the dehumidification heating mode.

(5) In the above-mentioned first embodiment, the first three-way valve 12a, the second three-way valve 12b, and the like are employed as the refrigerant circuit switching portion by way of example. However, the refrigerant circuit switching portion is not limited to this structure. For example, the refrigerant circuit switching portion may be configured by a combination of a three-way joint and on-off valves (electromagnetic valves) for opening/closing the respective inflow/outflow ports of the three-way joint.

(6) Although in the above-mentioned embodiments, the air-conditioning control program is executed to switch among the respective operation modes by way of example, switching among the operation modes is not limited thereto. For example, an operation mode setting switch may be provided on the operation panel to set the respective operation modes, whereby one operation mode may be switched to another according to an operation signal from the operation mode setting switch.

What is claimed is:

1. A refrigeration cycle device to be used for an air conditioner, the refrigeration cycle device comprising:
   a compressor adapted to compress and discharge a refrigerant;
   an interior radiator that heats ventilation air to be blown into a space to be air-conditioned, using a high-pressure side refrigerant in a cycle as a heat source;
   an interior evaporator that cools the ventilation air by exchanging heat between a low-pressure side refrigerant in the cycle and the ventilation air before passing through the interior radiator;
   an exterior heat exchanger that exchanges heat between the refrigerant and outside air;
   a first decompression device that decompresses the refrigerant flowing into the interior evaporator;
   a second decompression device that decompresses the refrigerant flowing into the exterior heat exchanger;
   an internal heat exchanger that exchanges heat between the high-pressure side refrigerant and the low-pressure side refrigerant;
   a bypass passage that allows the refrigerant to bypass a high-pressure side refrigerant passage of the internal heat exchanger;
   an opening/closing device that opens and closes the bypass passage;
   a branch portion that branches a flow of the refrigerant flowing out of the interior radiator;
   a merging portion that merges a flow of the refrigerant flowing out of the interior evaporator with a flow of the refrigerant flowing out of the exterior heat exchanger; and
   a refrigerant-circuit switching portion that switches a refrigerant circuit in the cycle, wherein
   the refrigerant-circuit switching portion is configured to be switchable between a cooling refrigerant circuit and a dehumidification heating refrigerant circuit,
   the cooling refrigerant circuit being adapted to allow the refrigerant discharged from the compressor to circulate through the exterior heat exchanger, the high-pressure side refrigerant passage, the first decompression device, the interior evaporator, the low-pressure side refrigerant passage, and a suction port side of the compressor in this order, in a state where the opening/closing device closes the bypass passage, and
   the dehumidification heating refrigerant circuit being adapted to allow the refrigerant discharged from the compressor to circulate through the interior radiator, the branch portion, the first decompression device, the interior evaporator, the merging portion, and the suction port side of the compressor in this order, while simultaneously allowing the refrigerant discharged from the compressor to circulate through the interior radiator, the branch portion, the second decompression device, the exterior heat exchanger, the bypass passage, the merging portion, and the suction port side of the compressor in this order, in a state where the opening/closing device opens the bypass passage, wherein the high-pressure side refrigerant passage of the internal heat exchanger is bypassed during operation of the dehumidification heating refrigerant circuit.

2. The refrigeration cycle device according to claim 1, further comprising a gas-liquid separator disposed in a refrigerant flow path that leads from a refrigerant outflow port of the merging portion to an inflow port side of the low-pressure side refrigerant passage, the gas-liquid separator being adapted to separate the refrigerant into a gas-phase refrigerant and a liquid-phase refrigerant, and allowing the separated gas-phase refrigerant to flow out to a downstream side of the refrigerant flow path.

3. The refrigeration cycle device according to claim 1, further comprising:

an evaporation pressure adjustment valve that adjusts a refrigerant evaporation pressure in the interior evaporator to a predetermined reference evaporation pressure or higher.

4. A refrigeration cycle device to be used for an air conditioner, the refrigeration cycle device comprising:

a compressor adapted to compress and discharge a refrigerant;

an interior radiator that heats ventilation air to be blown into a space to be air-conditioned, using a high-pressure side refrigerant in a cycle as a heat source;

an interior evaporator that cools the ventilation air by exchanging heat between a low-pressure side refrigerant in the cycle and the ventilation air before passing through the interior radiator;

an exterior heat exchanger that exchanges heat between the refrigerant and outside air;

a first decompression device that decompresses the refrigerant flowing into the interior evaporator;

a second decompression device that decompresses the refrigerant flowing into the exterior heat exchanger;

an internal heat exchanger that exchanges heat between the high-pressure side refrigerant and the low-pressure side refrigerant;

a bypass passage that allows the refrigerant to bypass a high-pressure side refrigerant passage of the internal heat exchanger;

an opening/closing device that opens and closes the bypass passage;

a branch portion that branches a flow of the refrigerant flowing out of the interior radiator;

a merging portion that merges a flow of the refrigerant flowing out of the interior evaporator with a flow of the refrigerant flowing out of the exterior heat exchanger; and a refrigerant-circuit switching portion that switches a refrigerant circuit in the cycle, wherein the refrigerant-circuit switching portion is configured to be switchable between a cooling refrigerant circuit and a dehumidification heating refrigerant circuit, the cooling refrigerant circuit being adapted to allow the refrigerant discharged from the compressor to circulate through the exterior heat exchanger, the high-pressure side refrigerant passage, the first decompression device, the interior evaporator, the low-pressure side refrigerant passage, and a suction port side of the compressor in this order, in a state where the opening/closing device closes the bypass passage, and the dehumidification heating refrigerant circuit being adapted to allow the refrigerant discharged from the compressor to circulate through the interior radiator, the branch portion, the first decompression device, the interior evaporator, the merging portion, and the suction port side of the compressor in this order, while simultaneously allowing the refrigerant discharged from the compressor to circulate through the interior radiator, the branch portion, the second decompression device, the exterior heat exchanger, the bypass passage, the merging portion, and the suction port side of the compressor in this order, in a state where the opening/closing device opens the bypass passage, wherein, an inlet of the bypass passage is located downstream of the exterior heat exchanger, the refrigerant-circuit switching portion is located upstream of the first decompression device, and the high-pressure side refrigerant passage and the low-pressure side refrigerant passage are located therebetween.

5. The refrigeration cycle device according to claim 4, wherein the inlet of the bypass passage is located immediately downstream of the exterior heat exchanger.

6. The refrigeration cycle device according to claim 4, further comprising:

an evaporation pressure adjustment valve that adjusts a refrigerant evaporation pressure in the interior evaporator to a predetermined reference evaporation pressure or higher.

7. The refrigeration cycle device according to claim 4, further comprising a gas-liquid separator disposed in a refrigerant flow path that leads from a refrigerant outflow port of the merging portion to an inflow port side of the low-pressure side refrigerant passage, the gas-liquid separator being adapted to separate the refrigerant into a gas-phase refrigerant and a liquid-phase refrigerant, and allowing the separated gas-phase refrigerant to flow out to a downstream side of the refrigerant flow path.

8. The refrigeration cycle device according to claim 4, wherein the high-pressure side refrigerant passage of the internal heat exchanger is bypassed during operation of the dehumidification heating refrigerant circuit.

9. The refrigeration cycle device according to claim 8, wherein the inlet of the bypass passage is located immediately downstream of the exterior heat exchanger.

10. A refrigeration cycle device to be used for an air conditioner, the refrigeration cycle device comprising:

a compressor adapted to compress and discharge a refrigerant;

an interior radiator that heats ventilation air to be blown into a space to be air-conditioned, using a high-pressure side refrigerant in a cycle as a heat source;

an interior evaporator that cools the ventilation air by exchanging heat between a low-pressure side refrigerant in the cycle and the ventilation air before passing through the interior radiator;

an exterior heat exchanger that exchanges heat between the refrigerant and outside air;

an interior expansion valve configured to decompress the refrigerant flowing into the interior evaporator;

an exterior expansion valve configured to decompress the refrigerant flowing into the exterior heat exchanger;

an internal heat exchanger that exchanges heat between the high-pressure side refrigerant and the low-pressure side refrigerant;

a bypass passage that allows the refrigerant to bypass a high-pressure side refrigerant passage of the internal heat exchanger;

an on-off valve configured to open and close the bypass passage;

a branch portion that branches a flow of the refrigerant flowing out of the interior radiator;

a merging portion that merges a flow of the refrigerant flowing out of the interior evaporator with a flow of the refrigerant flowing out of the exterior heat exchanger; and a refrigerant-circuit switching portion that switches a refrigerant circuit in the cycle, wherein the refrigerant-circuit switching portion is configured to be switchable between a cooling refrigerant circuit and a dehumidification heating refrigerant circuit, the cooling refrigerant circuit being adapted to allow the refrigerant discharged from the compressor to circulate through the exterior heat exchanger, the high-pressure side refrigerant passage, the interior expansion valve, the interior evaporator, the low-pressure side refrigerant passage, and a suction port side of the compressor in this order, in a state where the on-off valve closes the bypass passage, and the dehumidification heating refrigerant circuit being adapted to allow the refrigerant discharged from the compressor to circulate through the interior radiator, the branch portion, the interior expansion valve, the interior evaporator, the merging portion, and the suction port side of the compressor in this order, while simultaneously allowing the refrigerant discharged from the compressor to circulate through the interior radiator, the branch portion, the exterior expansion valve, the exterior heat exchanger, the bypass passage, the merging portion, and the suction port side of the compressor in this order, in a state where the on-off valve opens the bypass passage, wherein the high-pressure side refrigerant passage of the internal heat exchanger is bypassed during operation of the dehumidification heating refrigerant circuit.

11. The refrigeration cycle device according to claim 10, further comprising:

an evaporation pressure adjustment valve that adjusts a refrigerant evaporation pressure in the interior evaporator to a predetermined reference evaporation pressure or higher.

12. The refrigeration cycle device according to claim 10, further comprising a gas-liquid separator disposed in a refrigerant flow path that leads from a refrigerant outflow port of the merging portion to an inflow port side of the low-pressure side refrigerant passage, the gas-liquid separator being adapted to separate the refrigerant into a gas-phase refrigerant and a liquid-phase refrigerant, and allowing the separated gas-phase refrigerant to flow out to a downstream side of the refrigerant flow path.

13. The refrigeration cycle device according to claim 10, wherein an inlet of the bypass passage is located downstream of the exterior heat exchanger, the refrigerant-circuit switching portion is located upstream of the interior expansion valve, and the high-pressure side refrigerant passage and the low-pressure side refrigerant passage are located therebetween.

14. The refrigeration cycle device according to claim 13, wherein the inlet of the bypass passage is located immediately downstream of the exterior heat exchanger.

* * * * *